(12) United States Patent
Tochigi et al.

(10) Patent No.: US 7,414,761 B2
(45) Date of Patent: Aug. 19, 2008

(54) IMAGING OPTICAL SYSTEM AND IMAGE READING APPARATUS

(75) Inventors: Nobuyuki Tochigi, Tochigi (JP); Kazuyuki Kondo, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1042 days.

(21) Appl. No.: 10/439,018

(22) Filed: May 16, 2003

(65) Prior Publication Data

US 2003/0234966 A1    Dec. 25, 2003

(30) Foreign Application Priority Data

May 30, 2002  (JP) ............................. 2002-156825
Oct. 10, 2002  (JP) ............................. 2002-297570

(51) Int. Cl.
*H04N 1/04* (2006.01)

(52) U.S. Cl. .................... 358/483; 358/497; 358/474

(58) Field of Classification Search ................ 358/474, 358/497, 494, 483, 482, 475, 505, 509, 512–514, 358/208.1, 234–236, 216, 239; 250/208.1, 250/234–236, 216, 239; 399/211, 212; 359/857, 359/858, 859
See application file for complete search history.

(56) References Cited

U.S. PATENT DOCUMENTS

| | | | |
|---|---|---|---|
| 4,774,542 A | 9/1988 | Kondo | |
| 4,894,682 A | 1/1990 | Kondo | |
| 5,739,940 A | 4/1998 | Kondo | |
| 5,825,560 A | 10/1998 | Ogura et al. | |
| 5,914,819 A | 6/1999 | Kondo et al. | |
| 5,969,347 A | 10/1999 | Takano et al. | ................ 250/234 |
| 6,324,012 B1 | 11/2001 | Aratani et al. | ............... 359/627 |
| 6,623,131 B2* | 9/2003 | Ooki | ........................ 359/857 |
| 2002/0149854 A1 | 10/2002 | Tanaka et al. | |
| 2003/0038228 A1 | 2/2003 | Fujibayashi et al. | |
| 2006/0055987 A1* | 3/2006 | Tochigi et al. | ............... 358/474 |

FOREIGN PATENT DOCUMENTS

| | | |
|---|---|---|
| CN | 1188899 A | 7/1998 |
| CN | 2334123 Y | 8/1999 |
| JP | 3-113961 | 5/1991 |
| JP | 8-292371 | 11/1996 |
| JP | 8-292372 | 11/1996 |
| JP | 9-5650 | 1/1997 |

OTHER PUBLICATIONS

Oct. 15, 2004, Office Action issued by the Patent Office of the People's Republic of China in connection with Application No. 031381332.
Apr. 8, 2005, Office Action issued by the Patent Office of the People's Republic of China in connection with Application No. 031381332.

* cited by examiner

*Primary Examiner*—Cheukfan Lee
(74) *Attorney, Agent, or Firm*—Fitzpatrick, Cella, Harper & Scinto

(57) ABSTRACT

To provide a compact imaging optical system in which occurrence of an asymmetrical aberration is reduced and the optical performance is not deteriorated significantly by constituting the system by off-axial reflection surfaces, and an image reading apparatus using the same. The imaging optical system of the present invention is characterized in that, in the imaging optical system for imaging image information of an object surface on a line sensor, all of a plurality of reflection surfaces existing in an optical path from the original surface to the line sensor are off-axial reflecting surfaces.

15 Claims, 14 Drawing Sheets

IMAGING OPTICAL SYSTEM AND IMAGE READING APPARATUS

BACKGROUND OF THE INVENTION

1. Field of the Invention

The present invention relates to an imaging optical system and an image reading apparatus using the same. The present invention is particularly preferable in reading a monochrome image or a color scanner, a digital copier, a facsimile, or the like, which uses an imaging optical element with various kinds of aberrations corrected in good balance, including a plurality of small off-axial reflecting surfaces having high resolution.

2. Related Background Art

Up to now, a flat-bed type image scanner has been proposed, for example, in Japanese Patent Application Laid-Open No. 3-113961 as an image reading apparatus (image scanner) for reading image information on an original surface.

The flat-bed type image scanner has an imaging lens and a line sensor fixed therein and moves only a reflection mirror, thereby subjecting the original surface to slit exposure scanning to read the image information.

In recent years, a carriage integral type scanning system has often been employed, which integrates a mirror, an imaging lens, a line sensor, and the like in order to realize simplification of an apparatus structure, and scans an original surface.

FIG. 9 is a schematic main part view of a conventional image reading apparatus of a carriage integral type scanning system. In FIG. 9, light flux irradiated from an illumination light source 1 directly illuminates an original 8 mounted on an original table glass 2, an optical path of a reflected light flux from the original 8 is folded inside a carriage 6 via first reflection mirror 3a, second, reflection mirror 3b, and third reflection mirror 3c in order, and the light flux is focused on a surface of a line sensor 5 by an imaging lens (imaging optical system) 4. Then, the carriage 6 is moved in a direction of an arrow A (sub-scanning direction) shown in FIG. 9 by a sub-scanning motor 7, whereby image information of the original 8 is read. The line sensor 5 in FIG. 9 is constituted by arranging a plurality of light receiving elements in a one-dimensional direction (main-scanning direction).

FIG. 10 is an explanatory view of a basic structure of the image reading apparatus of FIG. 9.

In the figure, reference numeral 4 denotes an imaging optical system; 5R, 5G, and 5B, line sensors for reading colors R (red), G (green), and B (blue), respectively, of the line sensor 5; and 8R, 8G, and 8B, reading areas on an original surface corresponding to the line sensors 5R, 5G, and 5B, respectively. The carriage 6 is scanning a stationary original surface in the image reading apparatus shown in FIG. 9. However, carriage scanning is equivalent to a state in which the line sensor 5 and the imaging lens 4 are stationary and the original surface 8 is moving as shown in FIG. 10. By scanning the original surface, an identical part can be read by the line sensors of different colors with a certain time interval. In the above-mentioned structure, in the case in which the imaging lens 4 consists of an ordinary refraction system, an axial chromatic aberration and a chromatic aberration of magnification occur. Thus, defocus or positional deviation occur in line images to be formed on the line sensors 5B and 5R as compared with the reference line sensor 5G. Therefore, when respective color images are superimposed to reproduce an original image, blur or deviation is conspicuous in a resulting image. That is, in the case in which performances of a high aperture ratio and a high resolution are required, the requirement cannot be met.

On the other hand, recently, it has been clarified that, even in a decentered optical system, it is possible to establish an optical system in which aberrations are corrected sufficiently by introducing the concept of a reference axis to make constituent surfaces thereof asymmetry and aspherical. For example, a designing method of the optical system is disclosed in Japanese Patent Application Laid-Open No. 9-5650 and examples of the design are disclosed in Japanese Patent Application Laid-Open Nos. 8-292371 and 8-292372.

Such a decentered optical system is called an off-axial optical system (an optical system which is, when a reference axis along a light beam passing through a center of an image and a center of a pupil is assumed, defined as an optical system including a curved surface whose surface normal line at a crossing point with a reference axis of a constituent surface is not on the reference axis (off-axial curved surface). In this case, the reference axis has a bent shape). With this off-axial optical system, since constituent surfaces thereof are generally decentered and eclipse never occurs even on a reflection surface, it is easy to establish an optical system which uses a reflection surface. In addition, the off-axial optical system has such characteristics that an optical path can be drawn around relatively freely and an integral type optical system is easily manufactured with a technique for integrally molding constituent surfaces.

On the other hand, an image reading apparatus such as a digital copier has not been constituted by an integral type optical system yet because a high resolution and a high speed are required for such an image reading apparatus. Since an imaging lens required in the image reading apparatus needs to be bright and have a high resolution, it is difficult to increase an angle of view in order to secure an optical performance. If the angle of view is small, the resultant optical path length increases.

On the other hand, in the case in which a color image is read, as the resolution of the imaging lens becomes higher, the optical performance is adversely affected by a difference of imaging positions for respective colors due to a chromatic aberration or by a chromatic aberration such as color shift in a screen.

On the other hand, it is required to increase brightness (Fno and transmissivity) of an imaging optical system as the reading speed of an image becomes high. However, since a reflectance on a mirror is poor compared with a transmissivity of a lens of a coated refraction system, in the case in which a large number of mirrors are used in order to fold a long optical path, light from an illuminated original cannot be guided to a line sensor efficiently.

On the other hand, in the case in which an integral type optical system is constituted by a technique for integrally molding off-axial constituent surfaces with glass or plastics, the accuracy of a surface or the tolerance of an interval between surfaces has to be made extremely strict in order to prevent deterioration of the performance due to a manufacturing error of each off-axial constituent surface, which causes increase in manufacturing costs.

SUMMARY OF THE INVENTION

Therefore, the present invention has been devised in view of the above-mentioned problems, and it is an object of the present invention to provide an imaging optical system, in which occurrence of an asymmetrical aberration is reduced and the optical performance is not deteriorated significantly even if the imaging optical system is constituted by off-axial reflection surfaces, and an image reading apparatus using the same. In particular, it is an object of the present invention to provide an image reading apparatus such as a digital copier or an image scanner for which a high speed and a high resolution are required, in which integration of a carriage can be easily realized.

In order to solve the above-mentioned problems, according to one aspect of the present invention, an image optical system for imaging image information of an object surface on a line sensor is characterized in that when the number of times of reflection on reflection surfaces including a plurality of off-axial reflection surfaces, existing in an optical path from the object surface to the line sensor is assumed to be N and the number of times of reflection on the off-axial reflection surfaces is assumed to be n, conditional expressions $N \leq 10$ $0.3 \leq n/N \leq 1.0$ are satisfied.

Further, in the imaging optical system, it is preferable that plane reflection surfaces other than the off-axial reflection surfaces in the reflection surfaces are used in order from a reflection surface closest to the object side.

Further, in the imaging optical system, it is preferable that an angle defined by a reference axis light beam incident on a first reflection surface from the object surface and a reference axis light beam emitted on the line sensor from the off-axial reflection surfaces is 30° or more.

Further, in the imaging optical system, it is preferable that the plane reflection surfaces other than the off-axial reflection surfaces, and the off-axial reflection surfaces are formed on a housing for holding the line sensor.

Further, in the imaging optical system for imaging an image information of a object surface on a line sensor, it is preferable that all of the plurality of reflection surfaces existing in the optical path from the object surface to the line sensor have a curvature, and that the all plurality of reflection surfaces are constituted by the off-axial reflection surfaces.

Alternatively, in the imaging optical system, it is preferable that an angle defined by a reference axis light beam incident on a first reflection surface from the object surface and a reference axis light beam emitted on the line sensor from the off-axial reflection surfaces is 30° or more.

According to further aspect of the present invention, there is provided an image reading apparatus characterized by including: the imaging optical system as described above; an original table glass on which an original as the object is mounted; and a line sensor.

Further, in order to solve the above-mentioned problems, according to another aspect of the present invention, an image reading apparatus for imaging image information on an original surface on a line sensor with an imaging optical element composed of a plurality of off-axial reflection surfaces, and reading the image information with the line sensor is characterized in that at least one surface of the off-axial reflection surfaces is pivotably attached to a lens barrel.

Further, in the image reading apparatus, it is preferable that, assuming that a surface normal line in a point where a reference axis light beam is incident on the surface is Z axis, a direction parallel to a main-scanning direction on a plane perpendicular to the surface normal line is X axis, and a direction perpendicular to the X axis is Y axis, a pivotal direction of the pivotable off-axial reflection surfaces is at least one direction among six directions of parallel movement in the X, Y, and Z directions and rotational movement with the X, Y, and Z axis as rotation centers.

Further, in the image reading apparatus, it is preferable that the pivotable off-axial reflection surface is in the vicinity of a diaphragm.

Further, in the image reading apparatus, it is preferable that the line sensor is pivotably attached.

Further, in the image reading apparatus, it is preferable that the pivotable off-axial reflection surface is pivotally adjusted with reference to an output from the line sensor.

Further, in the image reading apparatus, it is preferable that the pivotable off-axial reflection surface is adhered upon completion of the pivotal adjustment.

DETAILED DESCRIPTION OF THE PREFERRED EMBODIMENTS

Figure 1:
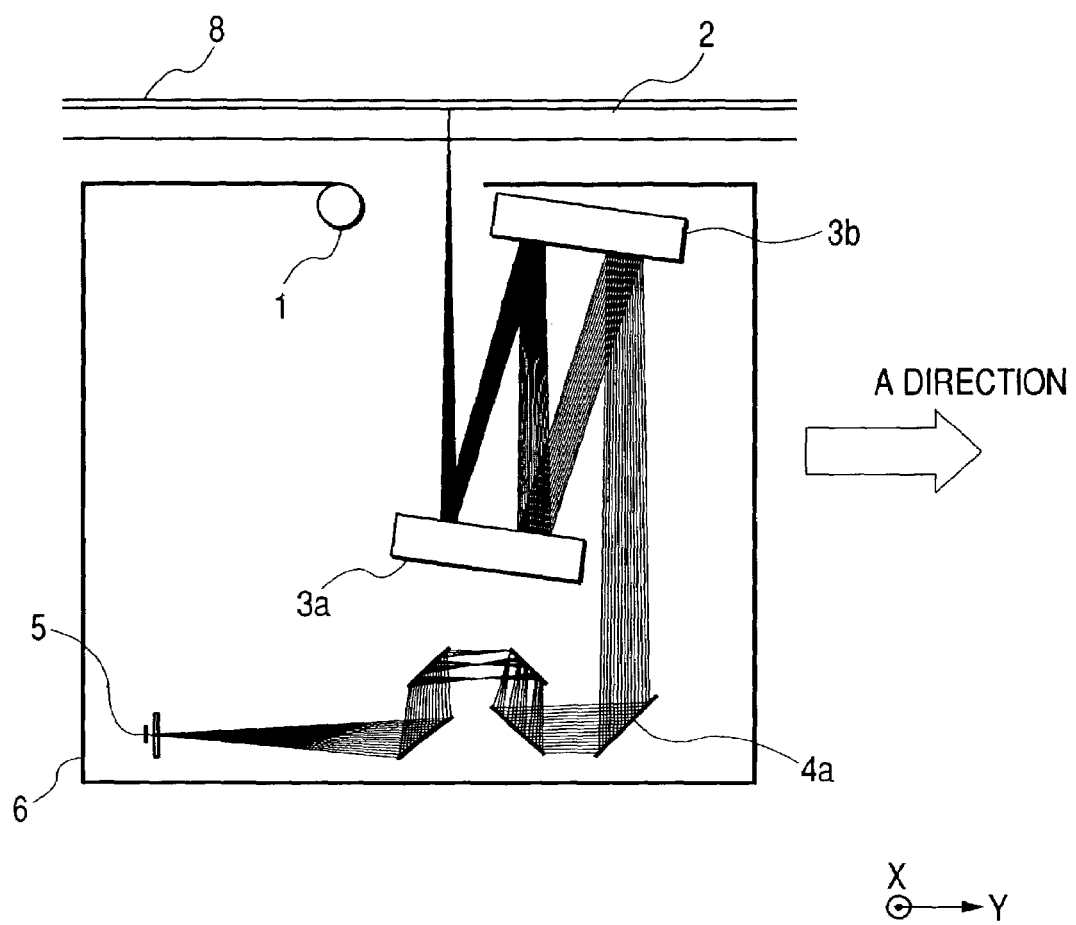
FIG. 1 is a main part sectional view of a first embodiment of an image reading and imaging optical system of the present invention.

FIG. 1 is a schematic main part view of a first embodiment of an image reading apparatus of the present invention.

In the figure, reference numeral 1 denotes a light source; 2, an original table glass; 3a and 3b, a first reflection mirror and a second reflection mirror; 4a, an imaging optical element; 5, a line sensor constituted by a CCD or the like; and 6, a carriage (housing).

The original 8 mounted on the original table glass 2 is imaged on the line sensor 5 by the imaging optical element 4a via the reflection mirrors 3a and 3b, whereby one line of the original 8 can be read. In order to make the image reading apparatus compact, an optical path is folded by the first reflection mirror 3a and the second reflection mirror 3b. The imaging optical element 4a also contributes to folding of the optical path. By using the imaging optical element 4a, an image reading apparatus of a carriage integral type optical system can be constituted by fewer components including two plane return mirrors and an imaging optical element, and it becomes possible to cope with miniaturization of the apparatus. As a result, high-speed reading is enabled.

Then, off-axial reflection surfaces can be handled effectively by controlling the total number of times of reflection N to be ten or less and a ratio of the number of times of reflection n on the off-axial reflection surfaces with respect to the total number of times of reflection N to be a fixed value or more.

Further, the overall reflectance is Nth power of a reflectance of each surface, and a loss of an amount of light from an original increases when the number of times of reflection N becomes excessive. Thus, a decrease in an amount of light due to a reflection surface is restricted by controlling the number of times of reflection N to be ten of less.

In this embodiment, the total number of times of reflection N is nine, among which five times of reflection are performed on the off-axial reflection surfaces. When the number of times of reflection on a reflection surface existing in an optical path from the original surface to the line sensor is assumed to be N and the number of times of reflection on the off-axial reflection surfaces is assumed to be n, n/N=0.56.

If the number of off-axial reflection surfaces decreases and the number of plane return mirrors increases, and n/N becomes smaller than 0.3, an increase in the space occupied by the plane return mirrors exceeds reduction of space achieved by folding of the optical path. Thus, there is a problem in that reduction in a size of the image reading apparatus is not realized, and a share of power for each surface of the off-axial reflection surfaces increases to deteriorate performance of the apparatus.

Therefore, in the present invention, it is preferable that $0.3 \leq n/N$ is satisfied.

Moreover, it is more preferable that $0.5 \leq n/N$ is satisfied.

If $0.5 \leq n/N$ is satisfied, an effect can be obtained, in which a power to be shared for one surface of off-axial reflection surfaces becomes small.

Further, by using a plane return mirror for a reflection surface close to an original side, an increase in size of the surface in the vicinity of an original surface can be coped with relatively inexpensively.

In the carriage integral type optical system, a surface of the original 8 is read two-dimensionally by moving the original 8 and the carriage 6 relatively in a direction perpendicular to a line direction (X direction) of the line sensor, that is, a sub-scanning direction (Y direction, A direction) to scan the original 8. Since an optical path can be drawn around relatively freely in the off-axial optical system, the original surface and the line sensor can be arranged relatively freely. However, the line sensor includes various members for adjusting to attach a circuit of a substrate etc. and the line sensor behind a sensor section thereof. Therefore, in the arrangement of the original surface and the line sensor, it is advisable to space a reference axis light beam from the original surface and a reference axis light beam from the line sensor a fixed angle (30°) or more apart from each other. In this embodiment, the angle is 90°.

In addition, the number of times of reflection n on the off-axial reflection surfaces is preferably three or more in order to obtain a favorable aberration on the line sensor.

Figure 2:
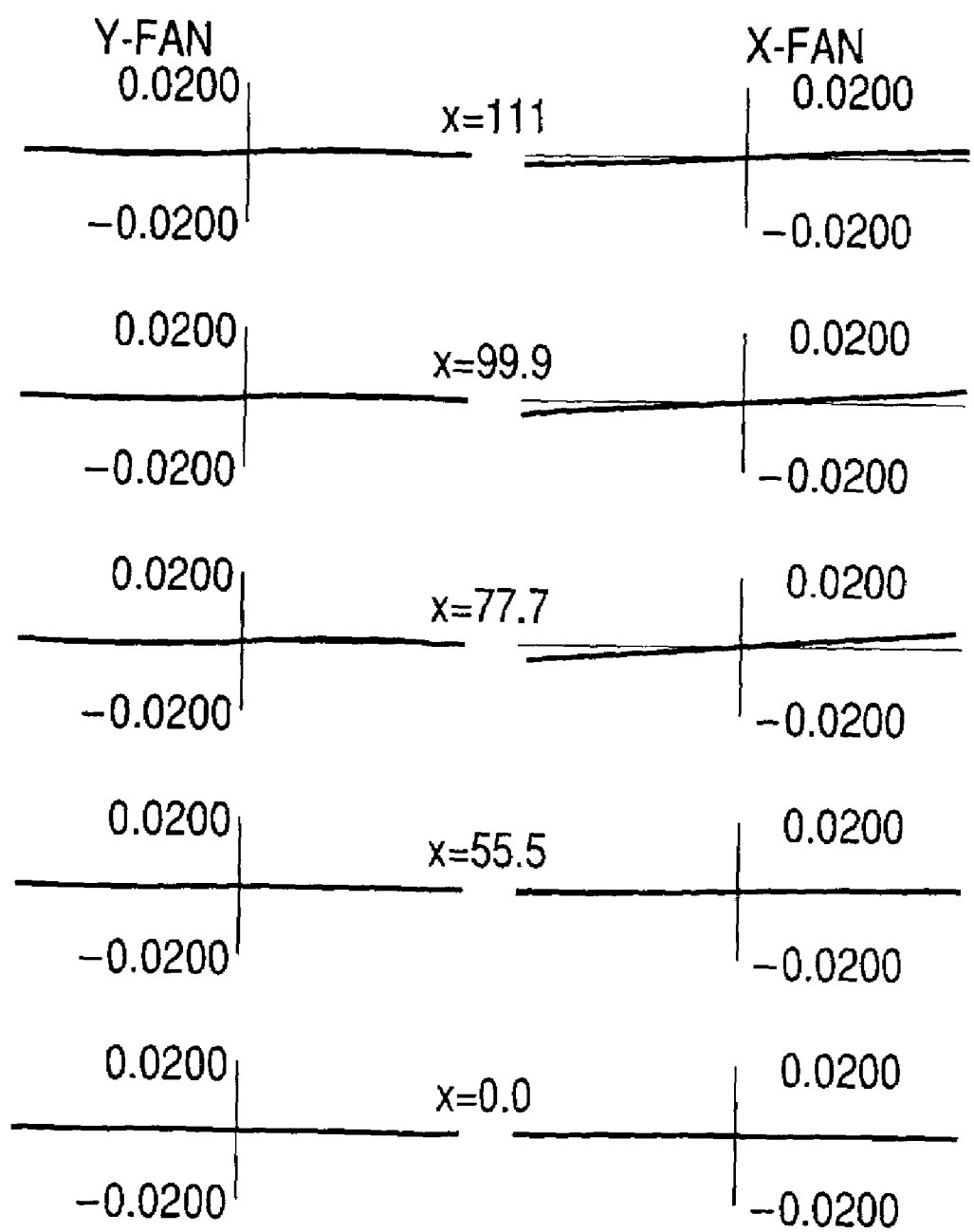
FIG. 2 is an aberration chart in the first embodiment of the image reading and imaging optical system of the present invention.

FIG. 2 shows an aberration chart for five points (image heights) in a line direction of the line sensor of the first embodiment. Reference symbol X in the figure denoted a height on the original surface.

In this embodiment, various aberrations are corrected satisfactorily.

Figure 3:
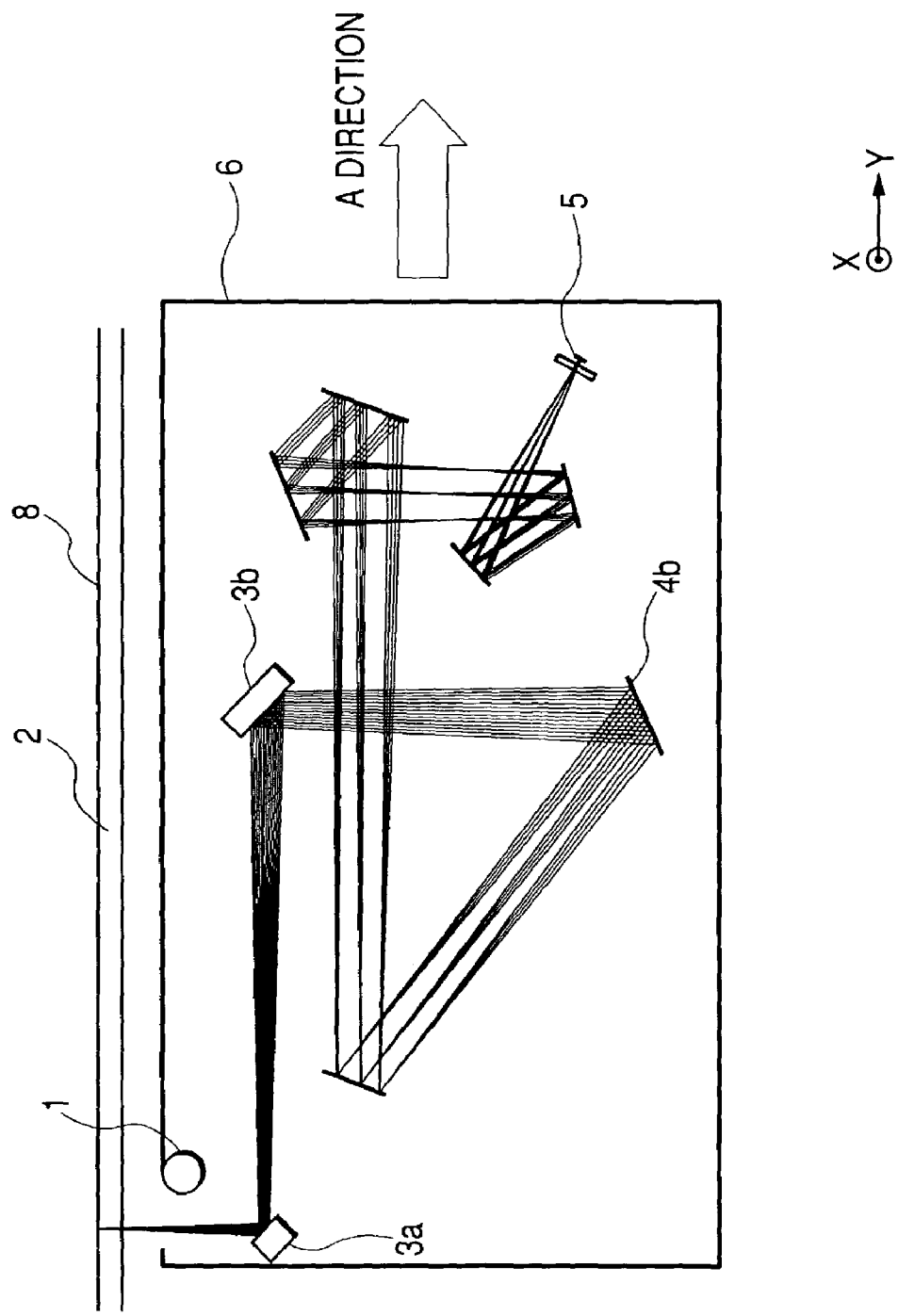
FIG. 3 is a main part sectional view of a second embodiment of the image reading and imaging optical system of the present invention.

FIG. 3 is a schematic main part view of a second embodiment of an image reading apparatus of the present invention.

In the second embodiment, the number of times of reflection is reduced from that of the first embodiment while using the surface on the original side 2 as a plane return mirror in the same manner as the first embodiment. Consequently, the image reading apparatus of the carriage integral type optical system can be constituted by fewer components consisting of an imaging optical element including two plane return mirrors and a plurality of off-axial reflection surfaces, and it becomes possible to cope with miniaturization of the apparatus. Moreover, high-speed reading is enabled by reducing a light amount loss due to a decrease in the number of times of reflection.

In this embodiment, the total number of times of reflection N is eight, among which six times of reflection are performed on the off-axial reflection surfaces. When the number of times of reflection on a reflection surface existing in an optical path from the original surface to the line sensor is assumed to be N and the number of times of reflection on the off-axial reflection surfaces is assumed to be n, n/N=0.75.

Thus, $0.3 \leq n/N \leq 1.0$ is satisfied.

Figure 4:
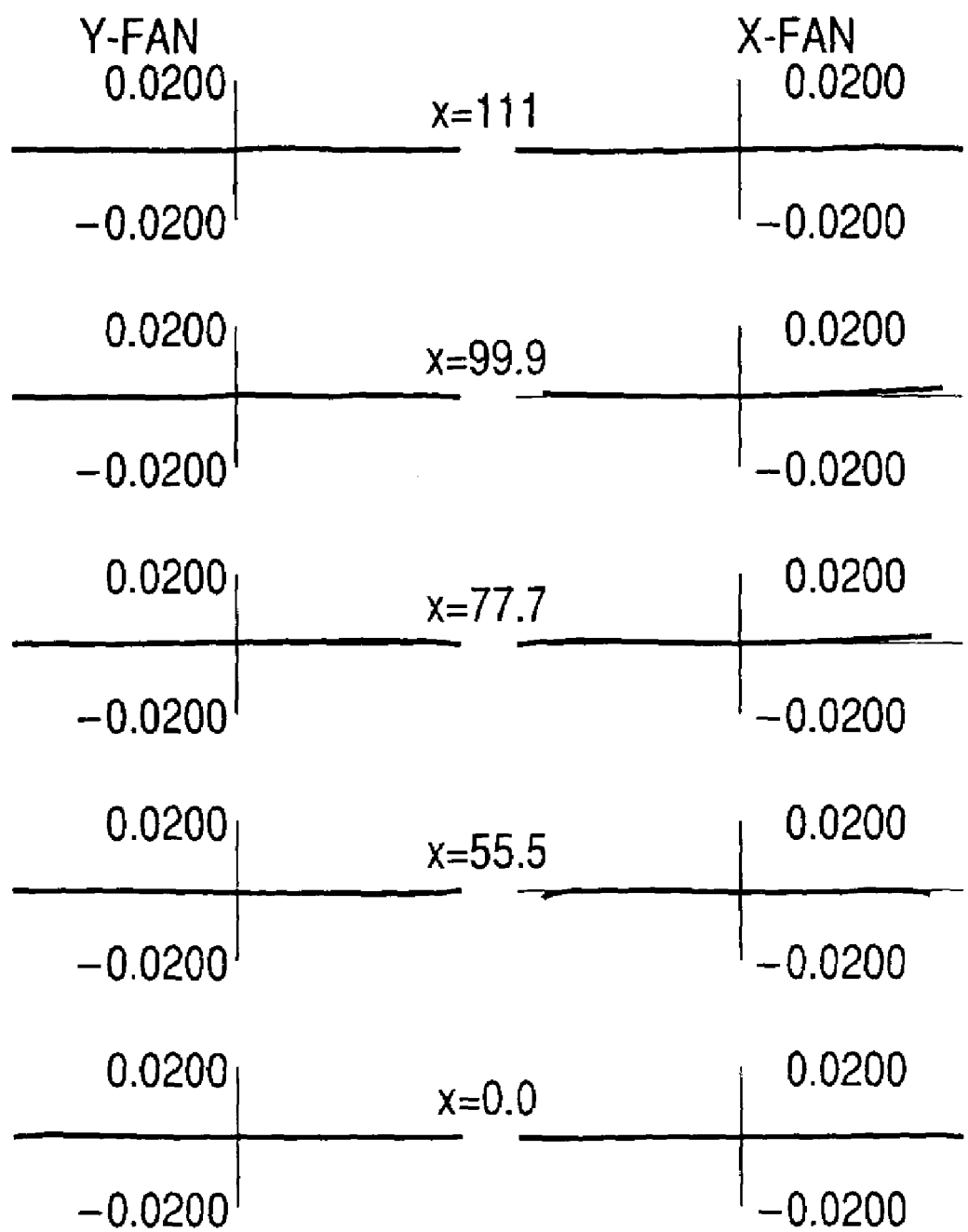
FIG. 4 is an aberration chart in the second embodiment of the image reading and imaging optical system of the present invention.

FIG. 4 shows an aberration chart for five points in a line direction of the line sensor of the second embodiment.

Figure 5:
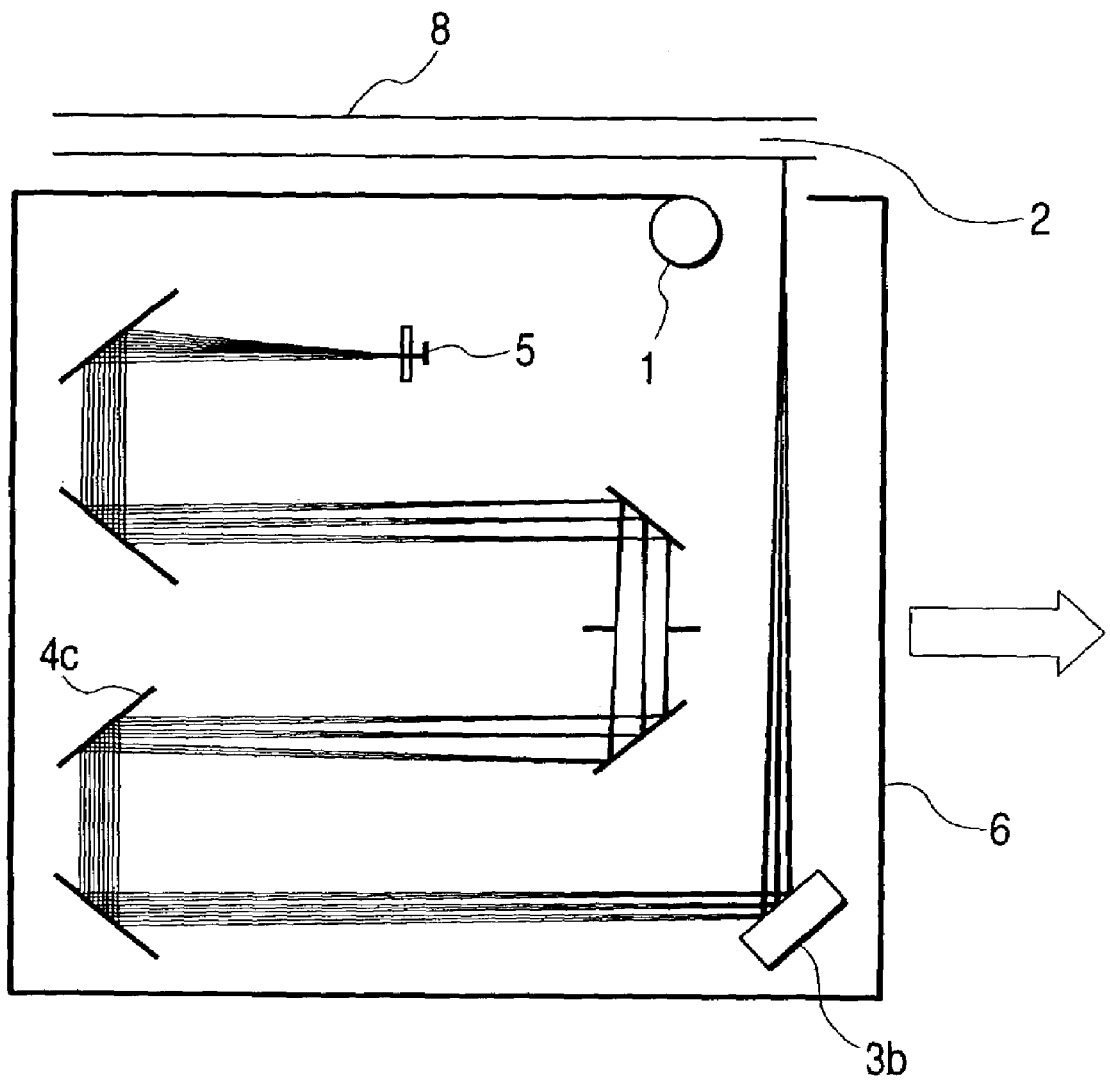
FIG. 5 is a main part sectional view of a third embodiment of the image reading and imaging optical system of the present invention.

FIG. 5 is a schematic main part view of a third embodiment of an image reading apparatus of the present invention.

In the third embodiment, one surface is used as a plane return mirror, and this plane return mirror is applied to a reflection surface closest to an original side. Consequently, the image reading apparatus of the carriage integral type optical system can be constituted by fewer components composed of an imaging optical element including one plane return mirror and a plurality of off-axial reflection surfaces, and it becomes possible to cope with miniaturization of the apparatus. Moreover, high-speed image reading is enabled by reducing a light amount loss by decreasing in the number of times of reflection. In this embodiment, the total number of times of reflection N is seven, among which six times of reflection are performed on the off-axial reflection surfaces. When the number of times of reflection on a reflection surface existing in an optical path from the original surface to the line sensor is assumed to be N and the number of times of reflection on the off-axial reflection surfaces is assumed to be n, n/N=0.86.

Thus, $0.3 \leq n/N \leq 1.0$ is satisfied.

Figure 6:
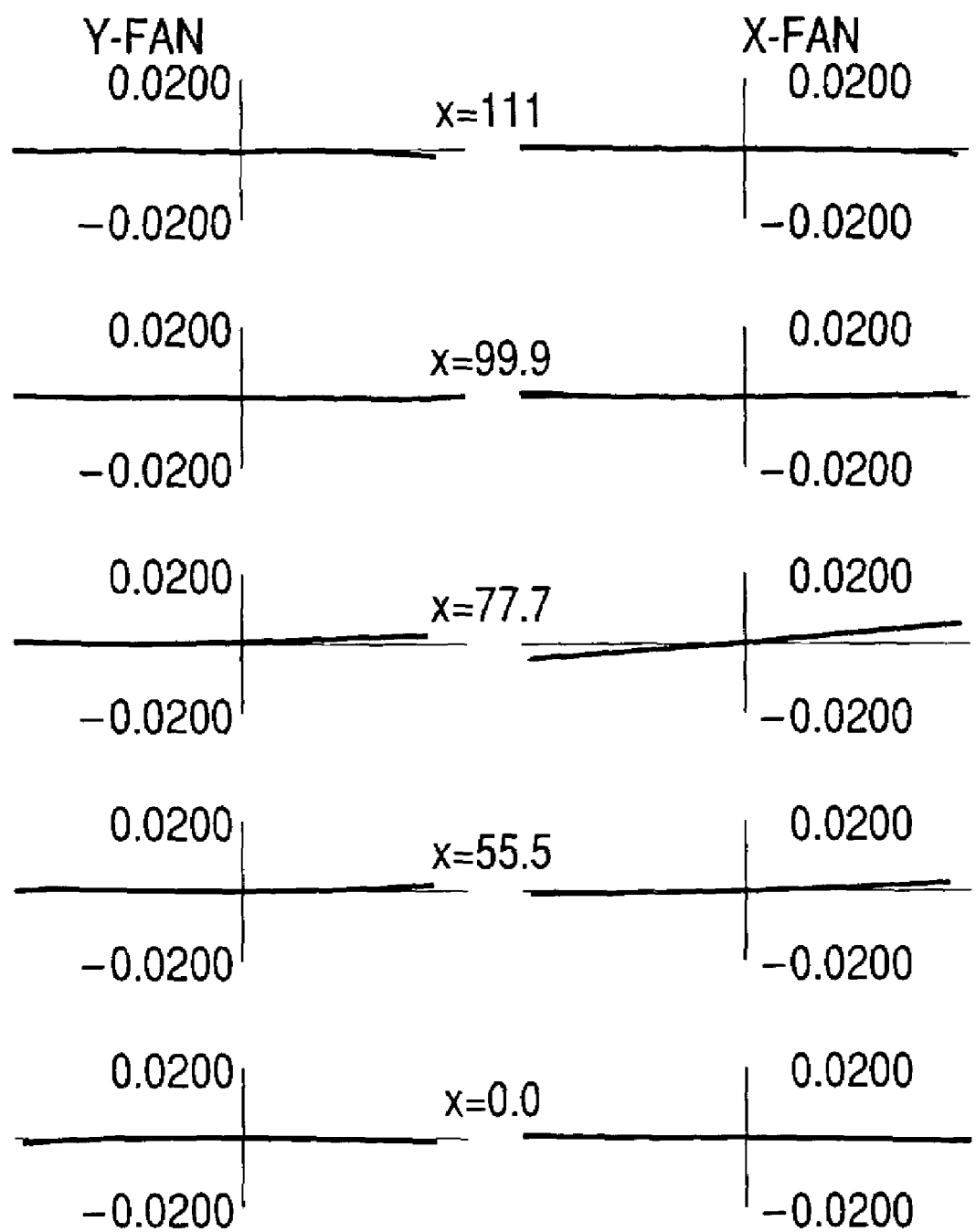
FIG. 6 is an aberration chart in the third embodiment of the image reading and imaging optical system of the present invention.

FIG. 6 shows an aberration chart for five points in a line direction of the line sensor of the third embodiment.

Figure 7:
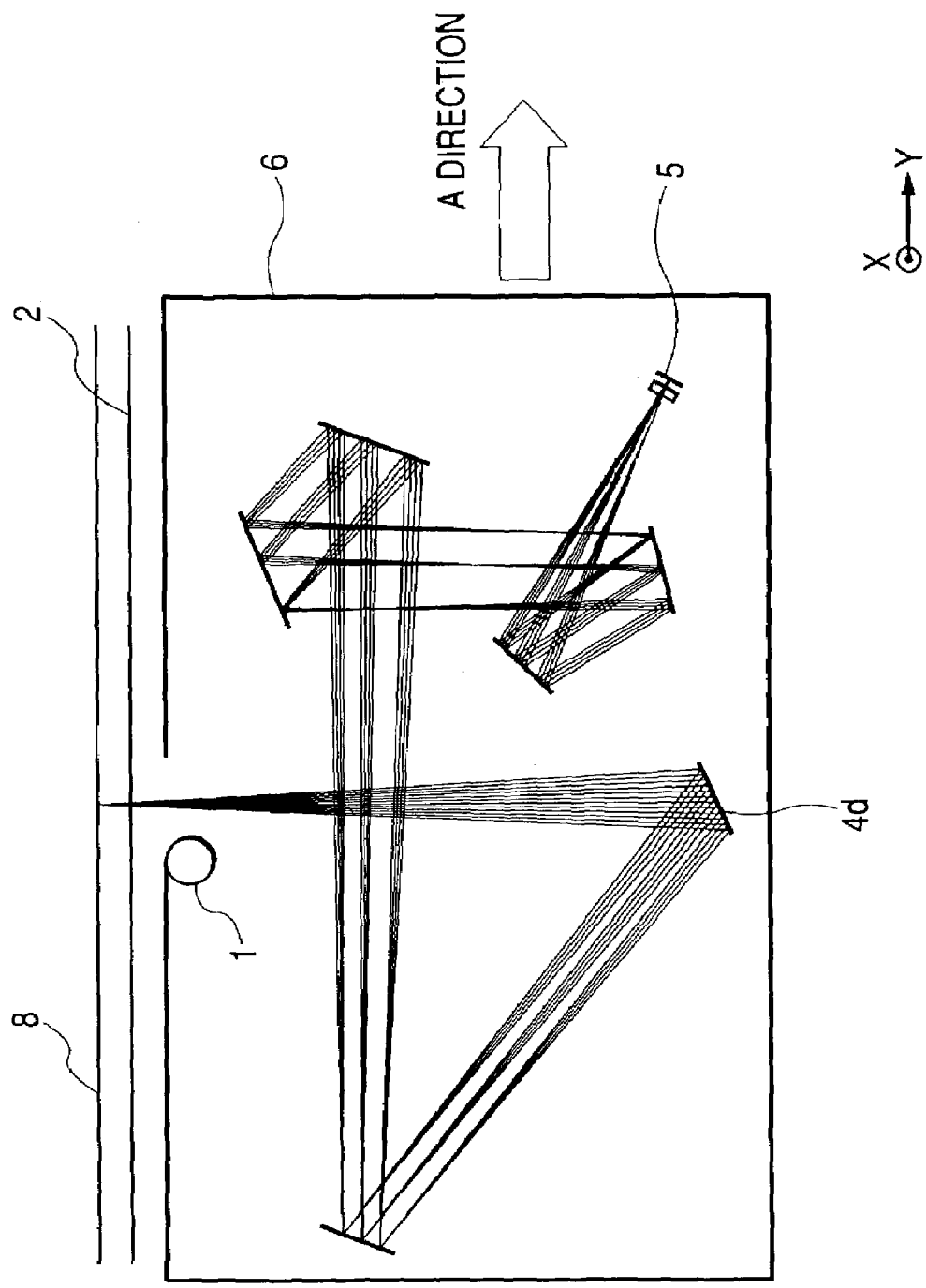
FIG. 7 is a main part sectional view of a fourth embodiment of the image reading and imaging optical system of the present invention.

FIG. 7 is a schematic main part view of a fourth embodiment of an image reading apparatus of the present invention.

In the fourth embodiment, the plane return mirror is eliminated, and the image reading apparatus is constituted only by a plurality of off-axial reflection surfaces serving as an imaging optical element. Consequently, the image reading apparatus can be constituted by fewer components, and it becomes possible to cope with miniaturization of the apparatus. Moreover, high-speed reading is enabled by reducing a light amount loss by decreasing in the number of times of reflection.

In this embodiment, the total number of times of reflection N is six, among which six times of reflection are performed on the off-axial reflection surfaces. When the number of times of reflection on a reflection surface existing in an optical path from the original surface to the line sensor is assumed to be N and the number of times of reflection on the off-axial reflection surfaces is assumed to be n, n/N=1.0.

Thus, $0.3 \leq n/N \leq 1.0$ is satisfied.

In addition, if these surfaces are formed on a housing, it becomes possible to further reduce the number of components.

Figure 8:
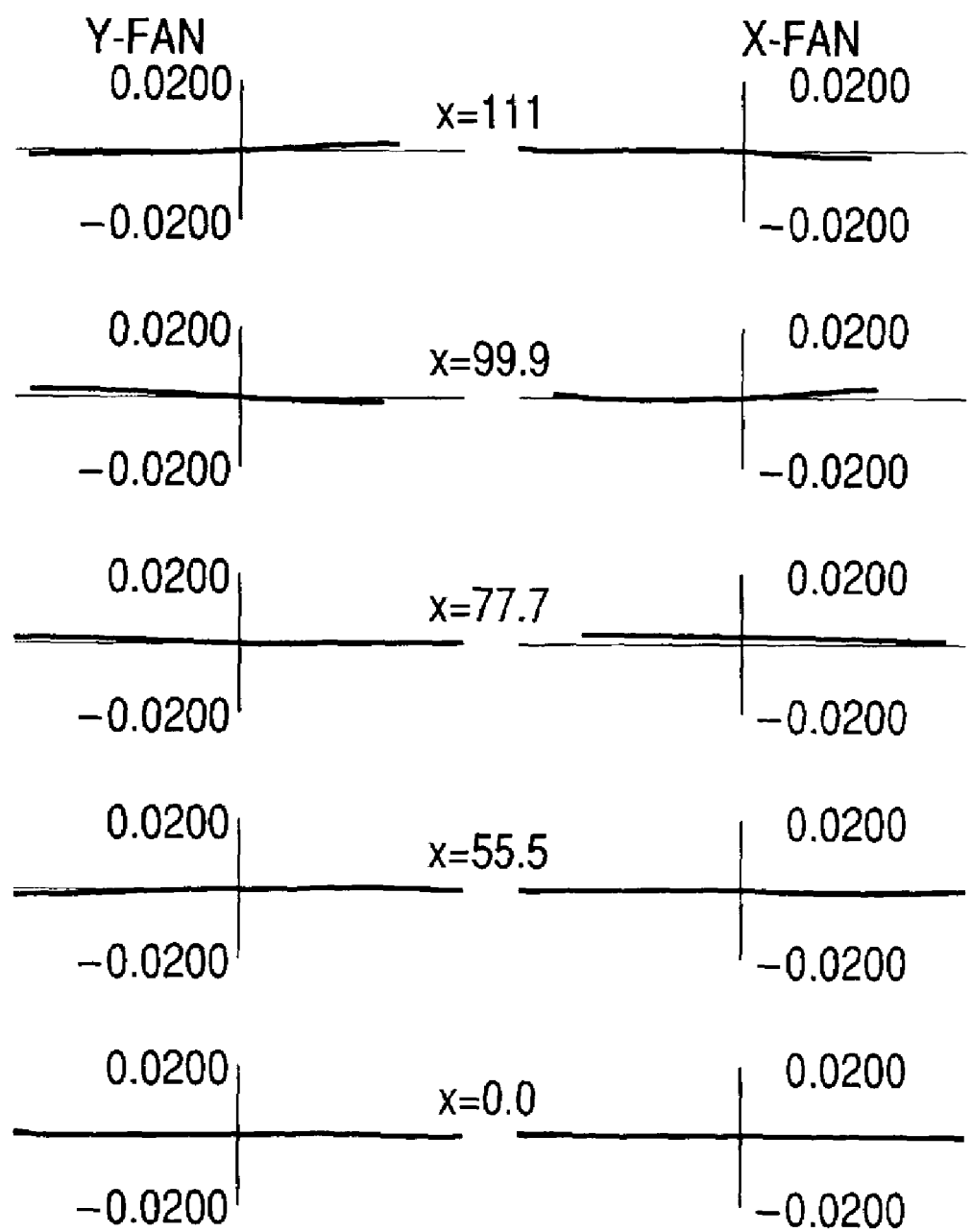
FIG. 8 is an aberration chart of the fourth embodiment of the image reading and imaging optical system of the present invention.
Figure 9:
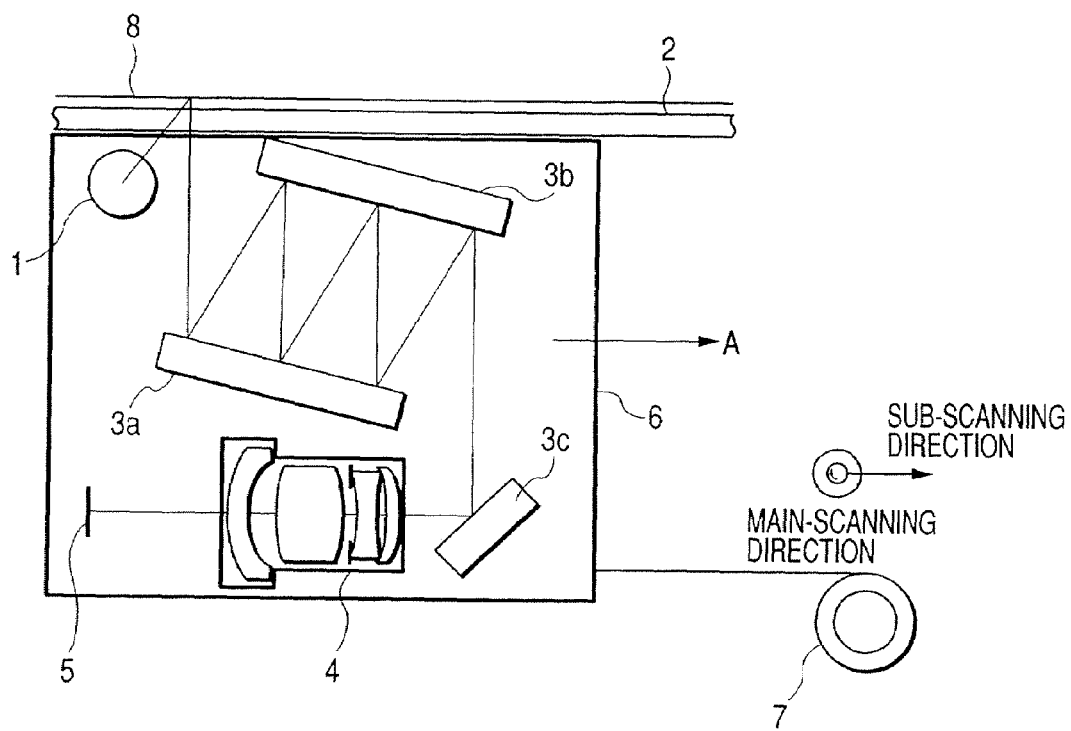
FIG. 9 is a view showing an example of an arrangement of a conventional carriage integral type scanning optical system.
Figure 10:
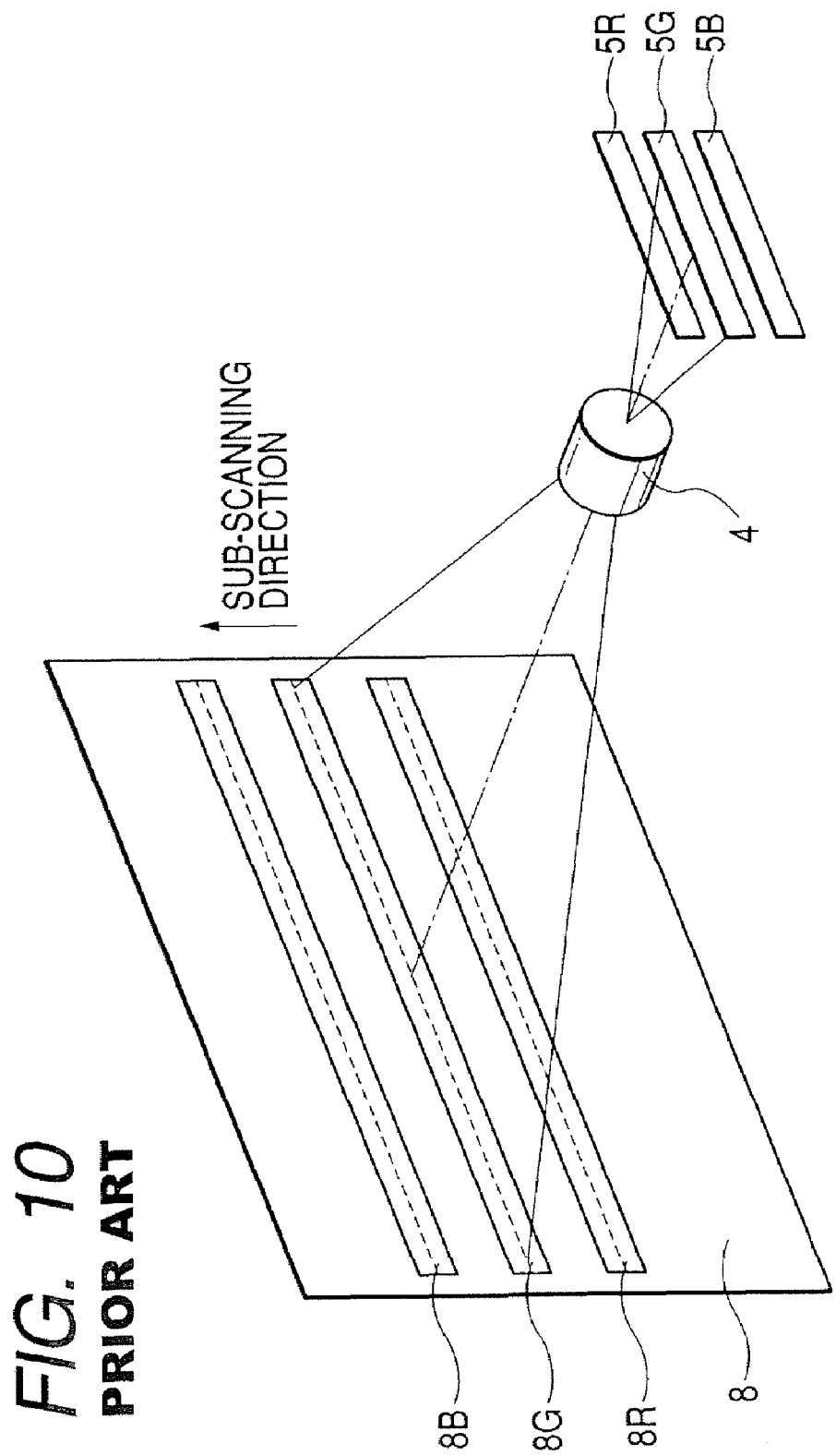
FIG. 10 is a schematic main part view illustrating a conventional color image reading apparatus.

FIG. 8 shows an aberration chart for five points in a line direction of the line sensor of the fourth embodiment. In order to clarify a configuration of the embodiments of the imaging optical element including a plurality of off-axial reflection surfaces of the present invention and a meaning of numerical values, the off-axial optical system referred to in this specification and a reference axis to be a framework thereof will be defined as described below.

Definition of a Reference Axis

In general, an optical path of a light beam having a reference wavelength to be a reference for a distance from an object to an image surface is defined as a reference axis in an optical system. Still, since a method of selecting a light beam to be a reference is ambiguous, usually, a reference light beam, that is, a reference axis is set according to one of two principles described below.

When an axis having symmetry exists at least partially in an optical system and an aberration can be adjusted with high symmetry, a light beam passing on the axis having symmetry is set as the reference light beam.

When a symmetrical axis does not generally exist in an optical system, or when an aberration can be adjusted with high symmetry even if a symmetrical axis exists partially, a light beam, which passes an optical system in an order of designated surfaces of the optical system and passes through a diaphragm center defined in the optical system, among light beams emitted from a center of an object surface (center of an image taken and observed area) is set as a reference light beam.

The reference axis defined as described above generally has a bent shape.

Definition of an Off-axial Optical System

A curved surface, a surface normal line of which does not coincide with the reference axis defined as described above at a point where the reference axis crosses the curved surface, is defined as an off-axial curved surface, and an optical system including the off-axial curved surface is defined as an off-axial optical system. (However, although the surface normal line does not coincide with the reference axis also in the case in which the reference axis is simply bent due to a plane reflection surface, since the plane reflection surface does not disturb symmetry of an aberration, it is excluded from an object of the off-axial optical system.)

In the embodiments of the present invention, a reference axis to be a reference of an optical system is set as described above. However, as a method of determining an axis to be a reference of an optical system, it is sufficient to adopt an axis which is convenient in optical designing, in adjusting an aberration, or in expressing a shape of each surface constituting the optical system.

However, in general, a route of a light beam, which passes a center of an image surface or an observation surface and a center of a diaphragm, an entrance pupil, an exit pupil, or a first surface of an optical system or a center of a last surface, is set as a reference axis to be a reference of the optical system. An order of the respective surfaces is set to an order in which a reference axis light beam is reflected on the surfaces.

Therefore, the reference axis finally reaches the center of the image surface while changing its direction in accordance with a rule of reflection along the set order of the respective surfaces.

Figure 11:
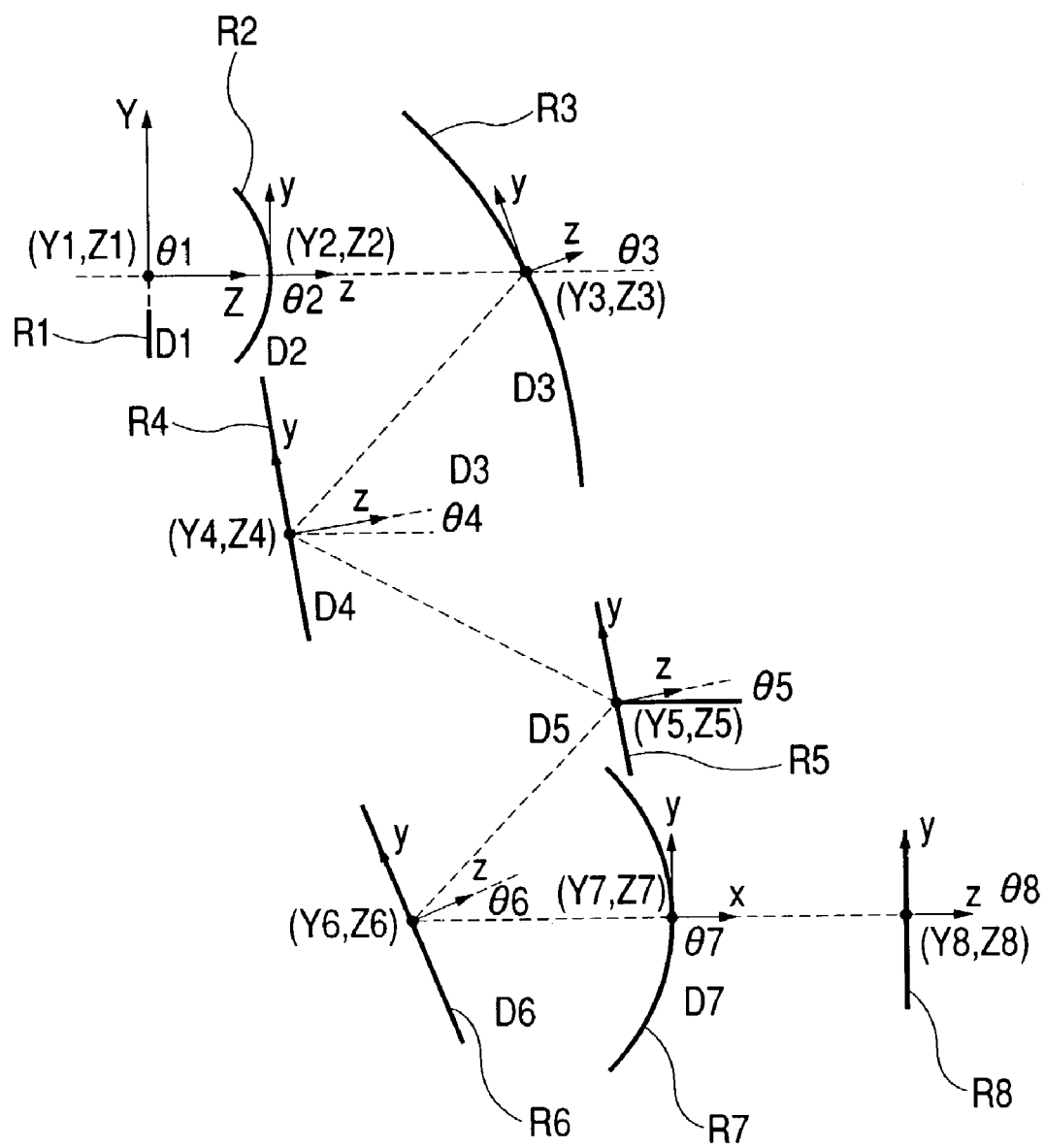
FIG. 11 illustrates the definition of an off-axial optical system in accordance with the present invention.

All tilt surfaces constituting the optical system of each embodiment of the present invention basically tilt within an identical surface. Thus, each axis of an absolute coordinate system is defined as follows (see FIG. 11).

Z axis: Reference axis passing the origin to reach a second surface

Y axis: Straight line passing the origin and forming an angle of 90° in the counterclockwise direction with respect to the Z axis within a tilt surface (within the paper surface of FIG. 11)

X axis: Straight line passing the origin and perpendicular to the Z and Y axes (straight line perpendicular to the paper surface of FIG. 11)

In addition, in order to represent a surface shape of an i-th surface constituting the optical system, the shape can be recognized easier by setting a local coordinate system with a point where the reference axis and the i-th surface cross as the origin to represent the surface shape of the surface with the local coordinate system than by representing the shape of the surface with an absolute coordinate system. Thus, in an embodiment in which constituent data of the present invention is displayed, the surface shape of the i-th surface is represented with the local coordinate system.

In addition, a tilt angle within a YZ surface of the i-th surface is represented by an angle $\theta i$ (unit: °) with an angle in a counterclockwise direction with respect to the Z axis of the absolute coordinate system as a positive angle. Thus, in each embodiment of the present invention, the origin of the local coordinates of each surface is on the YZ surface in FIG. 11.

Further, there is no eccentricity within the XZ and XY surfaces. Moreover, y and z axes of a local coordinates system (x, y, z) of the i-th surface incline $\theta i$ degrees within the YZ surface as well with respect to an absolute coordinate system (X, Y, Z), and are specifically set as follows.

z axis: Straight line passing the origin of the local coordinate system and forming the angle $\theta i$ in the counterclockwise direction within the YZ surface with respect to the Z axis direction of the absolute coordinate system y axis: Straight line passing the origin of the local coordinate system and forming an angle of 90° in the counterclockwise direction within the YZ surface with respect to the z direction x axis: Straight line passing the origin of the local coordinate system and perpendicular to the YZ surface In addition, the imaging optical element in the embodiments of the present invention has a rotationally asymmetrical aspherical surface, a shape of which is indicated by the following expression:

$$Z = C_{02}y^2 + C_{20}x^2 + C_{03}y^3 + C_{21}x^2y + C_{04}y^4 + C_{22}x^2y^2 + C_{40}x^4 + C_{05}y^5 + C_{23}x^2y^3 + C_{41}x^4y + C_{06}y^6 + C_{24}x^2y^4 + C_{42}x^4y^2 + C_{60}x^6$$

Note that a spherical surface has a shape represented by the following expression:

$$Z = ((x^2+y^2)/r_i)/(1+(1-(x^2+y^2)/r_i)^{1/2})$$

Since the above-mentioned curved surface expression has only an even number order concerning x, a curved surface specified by the above-mentioned curved surface expression has a surface symmetrical shape with the yz surface as a symmetrical surface. Moreover, in the case in which conditions described below are satisfied, the yz surface forms a shape symmetrical with respect to the xz surface.

The curved surface represents a rotationally symmetrical shape when the following expressions are satisfied.

$C_{03} = C_{21} = 0$ $C_{02} = C_{20}$

In addition, Di indicates a scalar representing an interval between origins of local coordinates between an ith surface and an (I+1)th surface, and Ndi indicates a refractive index of a medium between the ith surface and the (I+1)th surface.

An effective dimension (x×y) is an effective dimension in an x axis direction and a y axis direction of local coordinates on each surface.

Numerical data will be hereinafter shown for first to fourth numerical embodiments corresponding to the first to fourth embodiments of the present invention described above.

First numerical embodiment
Original reading width 222 mm, Imaging magnification −0.189
Original side NA 0.01, $f_{eq}$ 3.49

| i | $Y_i$ | $Z_i$ | $\theta_i$ | $D_i$ | $N_{di}$ | Effective dimension (x × y) | |
|---|---|---|---|---|---|---|---|
| 1 | 0.000 | 0.000 | 0 | 0.000 | — | — | Object surface (Original surface) |
| 2 | 0.000 | 0.000 | 0 | 3.000 | 1.51825 | — | Transmission surface |
| 3 | 0.000 | 3.000 | 0 | 39.289 | — | — | Transmission surface |
| 4 | 0.000 | 42.289 | −8 | 30.000 | — | 146.9 × 2.7 | Reflection surface |
| 5 | 8.269 | 13.451 | −8 | 30.000 | — | 115.2 × 3.9 | Reflection surface |
| 6 | 8.269 | 43.451 | −8 | 30.000 | — | 83.6 × 5.0 | Reflection surface |
| 7 | 16.538 | 14.613 | −8 | 50.000 | — | 33.9 × 2.8 | Reflection surface |
| 8 | 16.538 | 64.612 | 45 | 8.800 | — | 34.3 × 11.5 | Reflection surface |
| 9 | 7.738 | 64.612 | 45 | 7.500 | — | 15.2 × 7.5 | Reflection surface |
| 10 | 7.738 | 57.119 | −45 | 4.500 | — | 9.0 × 5.1 | Reflection surface |
| 11 | 3.238 | 57.119 | 0 | 4.500 | — | 3.7 × 3.2 | Transmission surface (Diaphragm) |
| 12 | −1.262 | 57.119 | −45 | 7.200 | — | 10.3 × 5.9 | Reflection surface |
| 13 | −1.262 | 64.319 | 45 | 26.505 | — | 21.8 × 8.7 | Reflection surface |
| 14 | 27.767 | 64.319 | 90 | 0.700 | 1.51825 | — | Transmission surface |
| 15 | 28.467 | 64.319 | 90 | 1.000 | — | — | Transmission surface |
| 16 | 29.467 | 64.319 | 90 | — | — | — | Image surface (Sensor surface) |

$C_{04} = C_{40} = C_{22}/2$ $C_{05} = C_{23} = C_{41} = 0$ $C_{60} = C_{06} = C_{24}/3 = C_{42}/3$

In the case in which the above conditions are not satisfied, the curved surface has a rotationally asymmetrical shape.

In addition, since not all the optical systems of the embodiments are a coaxial optical system, it is difficult to directly calculate a focal distance based upon a paraxial theory. Thus, a converted focal distance $f_{eq}$ according to the following definition is used.

$f_{eq} = h_1 / \tan(a_k')$

Note that, under the definition, in the case in which there are odd number of reflection surfaces, a sign of the focal distance is represented by a sign opposite to an ordinary sign.

Here, the definition of symbols is as follows.

h1: Incidence height of a light beam incident on the first surface in parallel to the reference axis and infinitely close to the reference axis $a_k'$: Angle defined by the light beam and the reference axis when the light beam is emitted from the last surface Next, in a numerical embodiment, a sign of a radius of curvature Ri is minus in the case in which a curvature center is on a first surface R1 side along a reference axis indicated by a dashed line extending from the first surface R1 to an imaging surface, and is plus in the case in which the curvature center is on the imaging surface side.

Aspherical Surface Shape

R8 Surface
$C_{02} = -4.2551e-3$
$C_{05} = -9.4257e-7$
$C_{21} = 9.0217e-5$
$C_{24} = -1.7100e-8$
$C_{42} = -4.1052e-9$
$C_{03} = -2.6801e-5$
$C_{06} = 3.0492e-8$
$C_{22} = -2.2024e-6$
$C_{40} = -3.9841e-7$
$C_{60} = 5.3591e-10$
$C_{04} = 4.5963e-6$
$C_{20} = -3.6870e-3$
$C_{23} = -3.1421e-9$
$C_{41} = -1.8072e-8$ R9 Surface
$C_{02} = -4.8683e-3$
$C_{05} = -4.7366e-6$
$C_{21} = 4.4839e-4$
$C_{24} = 4.3512e-7$
$C_{42} = 1.4203e-7$
$C_{03} = 5.4101e-4$
$C_{06} = -1.5015e-7$
$C_{22} = -1.8846e-5$
$C_{40} = -1.8604e-5$
$C_{60} = 3.6505e-9$
$C_{04} = 8.3634e-6$
$C_{20} = -7.3874e-3$ $C_{23}=-1.8722e-6$
$C_{41}=-2.8743e-7$ R10 Surface
$C_{02}=-2.7908e-3$
$C_{05}=9.8937e-6$
$C_{21}=2.1671e-4$
$C_{24}=5.4380e-7$
$C_{42}=-2.6552e-8$ $C_{03}=1.1244e-3$
$C_{06}=7.5953e-7$
$C_{22}=1.1108e-5$
$C_{40}=-1.1036e-5$
$C_{60}=2.1946e-8$
$C_{04}=1.0752e-4$
$C_{20}=-1.2629e-2$
$C_{23}=3.0439e-6$
$C_{41}=-3.2040e-7$ R12 Surface
$C_{02}=-2.9819e-3$
$C_{05}=3.8537e-6$
$C_{21}=2.8174e-4$
$C_{24}=44.2473e-7$
$C_{03}=4.7678e-4$
$C_{06}=6.7770e-8$
$C_{22}=4.6009e-5$
$C_{40}=8.3303e-6$
$C_{04}=3.1403e-5$
$C_{20}=-6.8034e-3$
$C_{23}=3.5470e-6$
$C_{41}=5.6903e-7$
$C_{42}=7.6729e-8$
$C_{60}=-1.4647e-7$ R13 Surface
$C_{02}=-7.1950e-3$
$C_{05}=-9.4998e-7$
$C_{21}=1.5329e-4$
$C_{24}=-3.0549e-8$
$C_{42}=2.9716e-8$ $C_{03}=-1.7259e-4$
$C_{06}=4.1164e-8$
$C_{22}=7.3131e-7$
$C_{40}=8.2861e-6$
$C_{60}=-2.7729e-9$
$C_{04}=7.2842e-6$
$C_{20}=-9.7983e-3$
$C_{23}=3.4130e-7$
$C_{41}=7.8146e-7$ Second numerical embodiment
Original reading width 222 mm, Imaging magnification −0.220
Original side NA 0.017, $f_{eq}$ 91.59

| i | $Y_i$ | $Z_i$ | $\theta_i$ | $D_i$ | $N_{di}$ | Effective dimension (X × Y) | |
|---|---|---|---|---|---|---|---|
| 1 | 0.000 | 0.000 | 0 | 0.000 | — | — | Object surface (Original surface) |
| 2 | 0.000 | 0.000 | 0 | 3.000 | 1.51825 | — | Transmission surface |
| 3 | 0.000 | 3.000 | 0 | 17.724 | — | — | Transmission surface |
| 4 | 0.000 | 20.724 | −45 | 62.714 | — | 216.2 × 1.8 | Reflection surface |
| 5 | 62.714 | 20.724 | −45 | 50.000 | — | 197.5 × 7.6 | Reflection surface |
| 6 | 62.714 | 70.724 | 25 | 57.652 | — | 184.3 × 10.9 | Reflection surface |
| 7 | 18.550 | 33.666 | 70 | 83.026 | — | 159.1 × 8.3 | Reflection surface |
| 8 | 101.576 | 33.666 | 69 | 14.000 | — | 55.0 × 11.7 | Reflection surface |
| 9 | 91.172 | 24.299 | 23.4 | 19.400 | — | 35.5 × 11.8 | Reflection surface |
| 10 | 90.765 | 43.694 | −1.2 | 16.940 | — | 6.7 × 7.8 | Transmission surface (Diaphragm) |
| 11 | 90.411 | 60.631 | 16.8 | 14.970 | — | 30.7 × 6.6 | Reflection surface |
| 12 | 81.867 | 48.338 | 48.8 | 26.847 | — | 44.9 × 4.9 | Reflection surface |
| 13 | 105.746 | 60.610 | 62.8 | 0.700 | 1.51825 | — | Transmission surface |
| 14 | 106.368 | 60.930 | 62.8 | 1.000 | — | — | Transmission surface |
| 15 | 107.258 | 61.387 | 62.8 | — | — | — | Image surface (Sensor surface) |

Aspherical Surface Shape

R6 Surface
$C_{02}=-9.0729e-4$
$C_{05}=2.4393e-7$
$C_{21}=1.3928e-6$
$C_{24}=-2.0109e-10$
$C_{42}=-9.5449e-13$
$C_{03}=7.2140e-5$
$C_{06}=-2.5737e-9$
$C_{22}=-1.4404e-7$
$C_{40}=-5.3588e-9$
$C_{60}=2.3843e-14$
$C_{04}=2.1563e-6$
$C_{20}=-2.2138e-4$
$C_{23}=-2.5485e-9$
$C_{41}=1.0077e-11$ R7 Surface
$C_{02}=-4.3198e-4$
$C_{05}=-1.5213e-7$
$C_{21}=7.8034e-6$
$C_{24}=4.4942e-10$
$C_{42}=-1.1177e-11$
$C_{03}=1.2065e-4$
$C_{06}=-7.8886e-9$
$C_{22}=-2.3493e-7$
$C_{40}=-9.0386e-9$
$C_{60}=2.0529e-13$
$C_{04}=-8.1471e-7$
$C_{20}=1.3103e-3$ $C_{23}=9.4836e-9$
$C_{41}=-5.2789e-11$ R8 Surface
$C_{02}=6.4922e-4$
$C_{05}=-1.2678e-7$
$C_{21}=9.1887e-5$
$C_{24}=8.2357e-10$
$C_{42}=-1.7029e-10$
$C_{03}=-2.4214e-4$
$C_{06}=-4.6726e-9$
$C_{22}=8.7763e-7$
$C_{40}=1.2828e-7$
$C_{60}=-1.6924e-11$
$C_{04}=3.2111e-6$
$C_{20}=4.7642e-4$
$C_{23}=1.3857e-8$
$C_{41}=-3.9791e-9$ R9 Surface
$C_{02}=3.0722e-3$
$C_{05}=-1.1527e-8$
$C_{21}=7.6946e-5$
$C_{24}=2.0547e-12$
$C_{03}=-2.7334e-4$
$C_{06}=4.0958e-9$
$C_{22}=1.1494e-6$
$C_{40}=-3.7732e-7$
$C_{04}=-5.9706e-6$
$C_{20}=1.6425e-3$
$C_{23}=2.2376e-8$
$C_{41}=-1.0670e-8$
$C_{42}=2.1895e-10$
$C_{60}=9.6423e-11$ R11 Surface
$C_{02}=-1.5269e-3$
$C_{05}=1.5595e-7$
$C_{21}=-1.3294e-5$
$C_{24}=-1.2633e-8$
$C_{42}=-3.3651e-10$
$C_{03}=-1.4109e-4$
$C_{06}=-4.6152e-8$
$C_{22}=-4.1008e-6$
$C_{40}=-2.4171e-7$
$C_{60}=1.7496e-10$
$C_{04}=1.1580e-5$
$C_{20}=-1.9386e-3$
$C_{23}=1.7330e-7$
$C_{41}=1.6975e-8$ R12 Surface
$C_{02}=2.8967e-3$
$C_{05}=1.7960e-6$
$C_{21}=-1.4446e-5$
$C_{24}=-2.8363e-8$
$C_{42}=-1.4990e-9$
$C_{03}=2.0681e-4$
$C_{06}=-2.4240e-7$
$C_{22}=-1.6856e-6$
$C_{40}=-4.1361e-8$
$C_{60}=-8.9041e-11$
$C_{04}=5.1766e-6$
$C_{20}=5.1504e-3$
$C_{23}=3.5202e-7$
$C_{4}=5.8611e-9$ Third numerical embodiment
Original reading width 222 mm, Imaging magnification −0.220
Original side NA 0.014, $f_{eq}$ 68.78

| i | $Y_i$ | $Z_i$ | $\theta_i$ | $D_i$ | $N_{di}$ | Effective dimension (X × Y) | |
|---|---|---|---|---|---|---|---|
| 1 | 0.000 | 0.000 | 0 | 0.000 | — | — | Object surface (Original surface) |
| 2 | 0.000 | 0.000 | 0 | 3.000 | 1.51825 | — | Transmission surface |
| 3 | 0.000 | 3.000 | 0 | 68.024 | — | — | Transmission surface |
| 4 | 0.000 | 71.024 | 45 | 50.000 | — | 143.6 × 5.3 | Reflection surface |
| 5 | 50.000 | 71.024 | 45 | 15.000 | — | 92.5 × 10.7 | Reflection surface |
| 6 | 50.000 | 56.024 | 45 | 40.000 | — | 67.6 × 10.6 | Reflection surface |
| 7 | 10.000 | 56.024 | −45 | 10.000 | — | 18.6 × 7.0 | Reflection surface |
| 8 | 10.000 | 46.024 | 0 | 10.000 | — | 4.7 × 4.2 | Transmission surface (Diaphragm) |
| 9 | 10.000 | 36.024 | −45 | 40.000 | — | 19.0 × 5.3 | Reflection surface |
| 10 | 50.000 | 36.024 | 45 | 15.000 | — | 63.5 × 13.0 | Reflection surface |
| 11 | 50.000 | 21.024 | 45 | 22.541 | — | 64.5 × 14.2 | Reflection surface |
| 12 | 27.459 | 21.024 | 90 | 0.700 | 1.51825 | — | Transmission surface |
| 13 | 26.759 | 21.024 | 90 | 1.000 | — | — | Transmission surface |
| 14 | 25.759 | 21.024 | 90 | — | — | — | Image surface (Sensor surface) |

Aspherical Surface Shape

R5 Surface
$C_{02}=-2.3813e-3$
$C_{05}=0.0000000$
$C_{21}=5.7540e-6$
$C_{24}=0.0000000$
$C_{42}=0.0000000$
$C_{03}=5.4599e-5$
$C_{06}=0.0000000$
$C_{22}=-6.2604e-8$
$C_{40}=-3.2591e-8$
$C_{60}=0.0000000$
$C_{04}=-1.2562e-6$
$C_{20}=-4.7144e-4$
$C_{23}=0.0000000$
$C_{41}=0.0000000$ R6 Surface
$C_{02}=-3.3126e-3$
$C_{05}=0.0000000$
$C_{21}=2.0493e-5$
$C_{24}=0.0000000$
$C_{42}=0.0000000$ $C_{03}=1.2466e-4$
$C_{06}=0.0000000$
$C_{22}=-3.2484e-8$
$C_{40}=1.3394e-8$
$C_{60}=0.0000000$
$C_{04}=-8.8886e-7$
$C_{20}=-1.8498e-4$
$C_{23}=0.0000000$
$C_{41}=0.0000000$ R7 Surface
$C_{02}=-3.7566e-3$
$C_{05}=0.0000000$
$C_{21}=-1.0041e-5$
$C_{24}=0.0000000$
$C_{42}=0.0000000$
$C_{03}=-2.9812e-6$
$C_{06}=0.0000000$
$C_{22}=-2.1738e-8$
$C_{40}=1.5080e-7$
$C_{60}=0.0000000$
$C_{04}=1.9166e-7$
$C_{20}=-2.3826e-3$
$C_{23}=0.0000000$
$C_{41}=0.0000000$ R9 Surface
$C_{02}=-3.9422e-3$
$C_{05}=0.0000000$
$C_{21}=-7.2645e-5$
$C_{24}=0.0000000$
$C_{03}=-1.6852e-5$
$C_{06}=0.0000000$
$C_{22}=-2.4921e-6$
$C_{40}=1.1699e-7$
$C_{04}=-3.1826e-7$
$C_{20}=2.4943e-4$
$C_{23}=0.0000000$
$C_{41}=0.0000000$
$C_{42}=0.0000000$
$C_{60}=0.0000000$ R10 Surface
$C_{02}=-4.2231e-3$
$C_{05}=0.0000000$
$C_{21}=-1.6707e-5$
$C_{24}=0.0000000$
$C_{42}=0.0000000$
$C_{03}=1.4819e-5$
$C_{06}=0.0000000$
$C_{22}=-3.3393e-7$
$C_{40}=-2.8141e-7$
$C_{60}=0.0000000$
$C_{04}=-8.0097e-7$
$C_{20}=-5.8345e-3$
$C_{23}=0.0000000$
$C_{41}=0.0000000$ R11 Surface
$C_{02}=2.5153e-3$
$C_{05}=0.0000000$
$C_{21}=3.6392e-5$
$C_{24}=0.0000000$
$C_{42}=0.0000000$
$C_{03}=5.4521e-5$
$C_{06}=0.0000000$
$C_{22}=7.3705e-7$
$C_{40}=4.4577e-8$
$C_{60}=0.0000000$
$C_{04}=-1.6620e-7$
$C_{20}=5.4677e-3$
$C_{23}=0.0000000$
$C_{41}=0.0000000$ Fourth numerical embodiment
Original reading width 222 mm, Imaging magnification −0.189
Original side NA 0.0165, $f_{eq}$ 29.44

| i | $Y_i$ | $Z_i$ | $\theta_i$ | $D_i$ | $N_{di}$ | Effective dimension $(X \times Y)$ | |
|---|---|---|---|---|---|---|---|
| 1 | 0.000 | 0.000 | 0 | 0.000 | — | — | Object surface (Original surface) |
| 2 | 0.000 | 0.000 | 0 | 3.000 | 1.51825 | — | Transmission surface |
| 3 | 0.000 | 3.000 | 0 | 53.024 | — | — | Transmission surface |
| 4 | 0.000 | 56.024 | 25 | 50.000 | — | 188.6 × 7.8 | Reflection surface |
| 5 | −38.302 | 23.885 | 70 | 70.000 | — | 155.9 × 4.2 | Reflection surface |
| 6 | 31.698 | 23.885 | 69 | 14.000 | — | 53.8 × 11.3 | Reflection surface |
| 7 | 21.294 | 14.517 | 23.4 | 19.400 | — | 33.5 × 11.2 | Reflection surface |
| 8 | 20.887 | 33.913 | −1.2 | 16.940 | — | 5.7 × 8.2 | Transmission surface (Diaphragm) |
| 9 | 20.533 | 50.849 | 16.8 | 14.970 | — | 30.0 × 6.9 | Reflection surface |
| 10 | 11.989 | 38.556 | 48.8 | 26.657 | — | 42.9 × 5.2 | Reflection surface |
| 11 | 35.698 | 50.741 | 62.8 | 0.700 | 1.51825 | — | Transmission surface |
| 12 | 36.320 | 51.061 | 62.8 | 1.000 | — | — | Transmission surface |
| 13 | 37.210 | 51.518 | 62.8 | — | — | — | Image surface (Sensor surface) |

Aspherical Surface Shape

Figure 12:
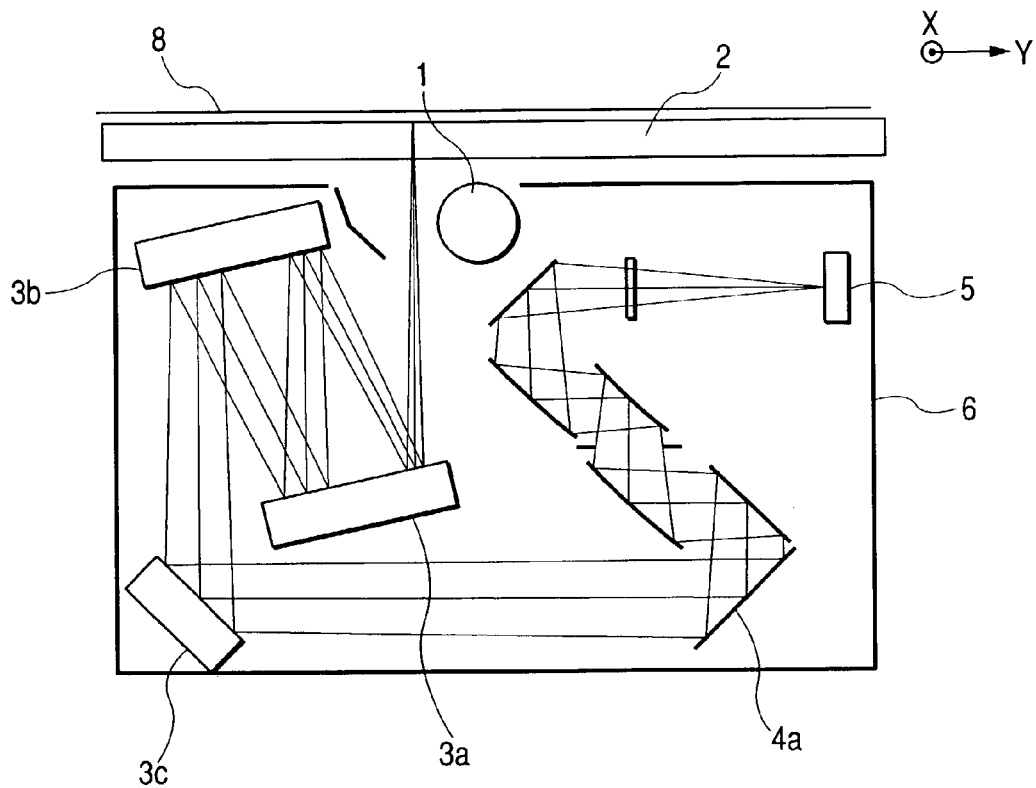
FIG. 12 is a schematic sectional view of an image reading apparatus of a fifth embodiment of the present invention.
Figure 13:
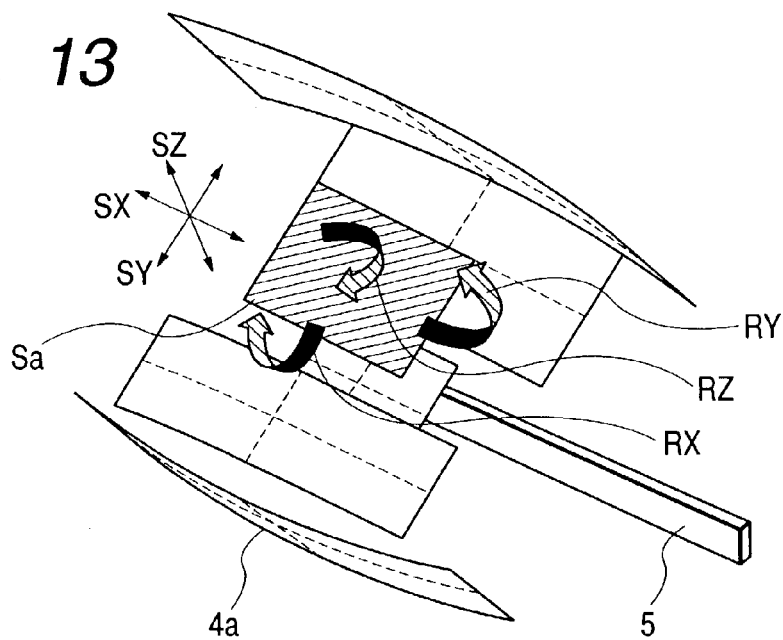
FIG. 13 is a perspective view of an imaging optical element and a line sensor of the fifth embodiment of the present invention.

R4 Surface
$C_{02}=2.5059e-4$
$C_{05}=-1.6802e-6$
$C_{21}=-2.3957e-6$
$C_{24}=1.0492e-9$
$C_{42}=2.3843e-12$
$C_{06}=3.2858e-8$
$C_{22}=-3.0832e-7$
$C_{40}=-5.4465e-9$
$C_{60}=-7.1270e-13$
$C_{03}=2.5407e-4$
$C_{04}=7.1782e-6$
$C_{20}=1.3727e-4$
$C_{23}=-1.3699e-8$
$C_{41}=8.6787e-11$ R5 Surface
$C_{02}=-9.7397e-4$
$C_{05}=1.2067e-6$
$C_{21}=8.2195e-6$
$C_{24}=-1.1989e-9$
$C_{42}=1.1476e-11$
$C_{03}=3.2772e-4$
$C_{06}=3.3670e-8$
$C_{22}=-1.3680e-7$
$C_{40}=-2.2428e-9$
$C_{60}=11.1843e-12$
$C_{04}=-2.0940e-5$
$C_{20}=1.0361e-3$
$C_{23}=1.2879e-8$
$C_{41}=-3.2182e-10$ R6 Surface
$C_{02}=5.2483e-4$
$C_{05}=-1.4264e-7$
$C_{21}=1.0011e-4$
$C_{24}=-4.9808e-11$
$C_{42}=-4.1198e-10$
$C_{03}=-2.4407e-4$
$C_{06}=-5.8762e-10$
$C_{22}=1.0465e-6$
$C_{40}=2.1117e-7$
$C_{60}=1.3140e-12$
$C_{04}=3.1834e-6$
$C_{20}=9.0949e-4$
$C_{23}=1.7648e-9$
$C_{41}=-9.2611e-9$ R7 Surface
$C_{02}=3.1642e-3$
$C_{05}=6.0398e-8$
$C_{21}=7.6158e-5$
$C_{24}=-1.2074e-9$
$C_{03}=-2.8237e-4$
$C_{06}=8.5905e-9$
$C_{22}=7.1783e-7$
$C_{40}=-5.8995e-7$
$C_{04}=-5.4827e-6$
$C_{20}=1.5471e-3$
$C_{23}=2.3036e-8$
$C_{41}=-1.9430e-8$
$C_{42}=5.8013e-10$
$C_{60}=1.2001e-10$ R9 Surface
$C_{02}=-1.8528e-3$
$C_{05}=-2.3858e-7$
$C_{21}=-2.5712e-5$
$C_{24}=-2.1228e-9$
$C_{42}=1.3355e-9$
$C_{03}=-9.7865e-5$
$C_{06}=3.5364e-8$
$C_{22}=-3.5516e-8$
$C_{40}=-3.7884e-8$
$C_{60}=2.0154e-10$
$C_{04}=1.5739e-5$
$C_{20}=-2.8328e-3$
$C_{23}=3.1067e-7$
$C_{41}=2.6025e-8$ R10 Surface
$C_{02}=3.9503e-3$
$C_{05}=4.6931e-7$
$C_{21}=-1.2595e-5$
$C_{24}=-4.1474e-8$ $C_{42}=-3.6909e-10$
$C_{03}=2.8520e-4$
$C_{06}=4.6106e-8$
$C_{22}=-1.7185e-6$
$C_{40}=2.9029e-7$
$C_{6}=2.0032e-10$
$C_{04}=2.6459e-6$
$C_{20}=6.2496e-3$
$C_{23}=6.1708e-7$
$C_{41}=7.8460e-9$ FIGS. 12 and 13 represent a fifth embodiment of the present invention. FIG. 12 is a schematic sectional view of an image reading apparatus of this embodiment. In the figure, reference numeral 1 denotes a light source; 2, an original table glass; 3a, 3b, and 3c, first reflection mirror, second reflection mirror, and third mirror; 4a, an imaging optical element; 5 a line sensor constituted by a CCD or the like; and 6, a carriage (housing).

The original 8 mounted on the original table glass 2 is imaged on the line sensor 5 by the imaging optical element 4a via the reflection mirrors 3a, 3b, and 3c, whereby one line of the original 8 can be read. In order to make the image reading apparatus compact, an optical path is folded by the first reflection mirror 3a, the second reflection mirror 3b, and the third reflection mirror 3c. The imaging optical element 4a also contributes to folding of the optical path. By using the imaging optical element 4a, an image reading apparatus of a carriage integral type optical system can be constituted by fewer components including three plane return mirrors and an imaging optical element, and it becomes possible to cope with miniaturization of the apparatus. As a result, high-speed reading is enabled.

In the carriage integral type optical system, a surface of the original 8 is read two-dimensionally by moving the original 8 and the carriage 6 relatively in a direction perpendicular to a line direction (X direction) of the line sensor, that is, a sub-scanning direction (Y direction, A direction) to scan the original 8.

FIG. 13 is a perspective view of the imaging optical element 4a and the line sensor 5 of this embodiment. In FIG. 13, the image optical element 4a and the line sensor 5 are shown in a vertically inverted state, which does not affect the gist of the present invention.

Here, image information is inputted to the imaging optical element 4a, an output from the line sensor 5 is read, and an off-axial reflection surface Sa is adjusted in SX, SY, SZ, RX, RY, and RZ directions so as to have a given performance. The off-axial reflection surface Sa used in the adjustment is preferably a surface in the vicinity of a diaphragm. This is because the surface in the vicinity of the diaphragm is relatively more sensitive to a change in an MTF performance, can be adjusted with a slight amount of movement, and does not affect other distortion or the like. At this point, the off-axial reflection surface Sa may be adjusted with respect to another off-axial reflection surface serving as an imaging optical element unit on a tool for adjustment, adhered using an optical hardening resin, a crew lock agent, an epoxy resin, or the like, and then attached to the carriage 6 as an imaging optical element unit. In addition, the off-axial reflection surface Sa may be adjusted and adhered in a state in which it is attached to the carriage 6, that is, a return mirror is included therein.

Figure 14:
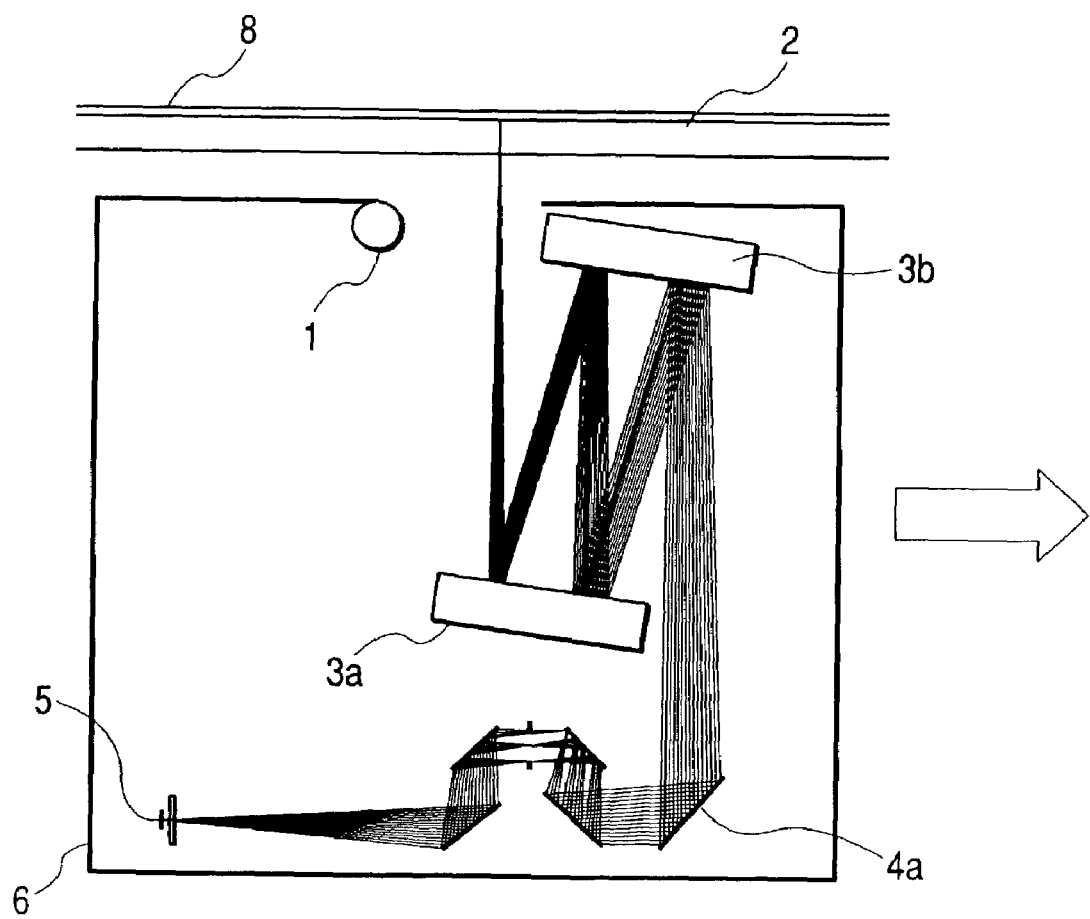
FIG. 14 is a schematic sectional view of an image reading apparatus of a sixth embodiment of the present invention.
Figure 15:
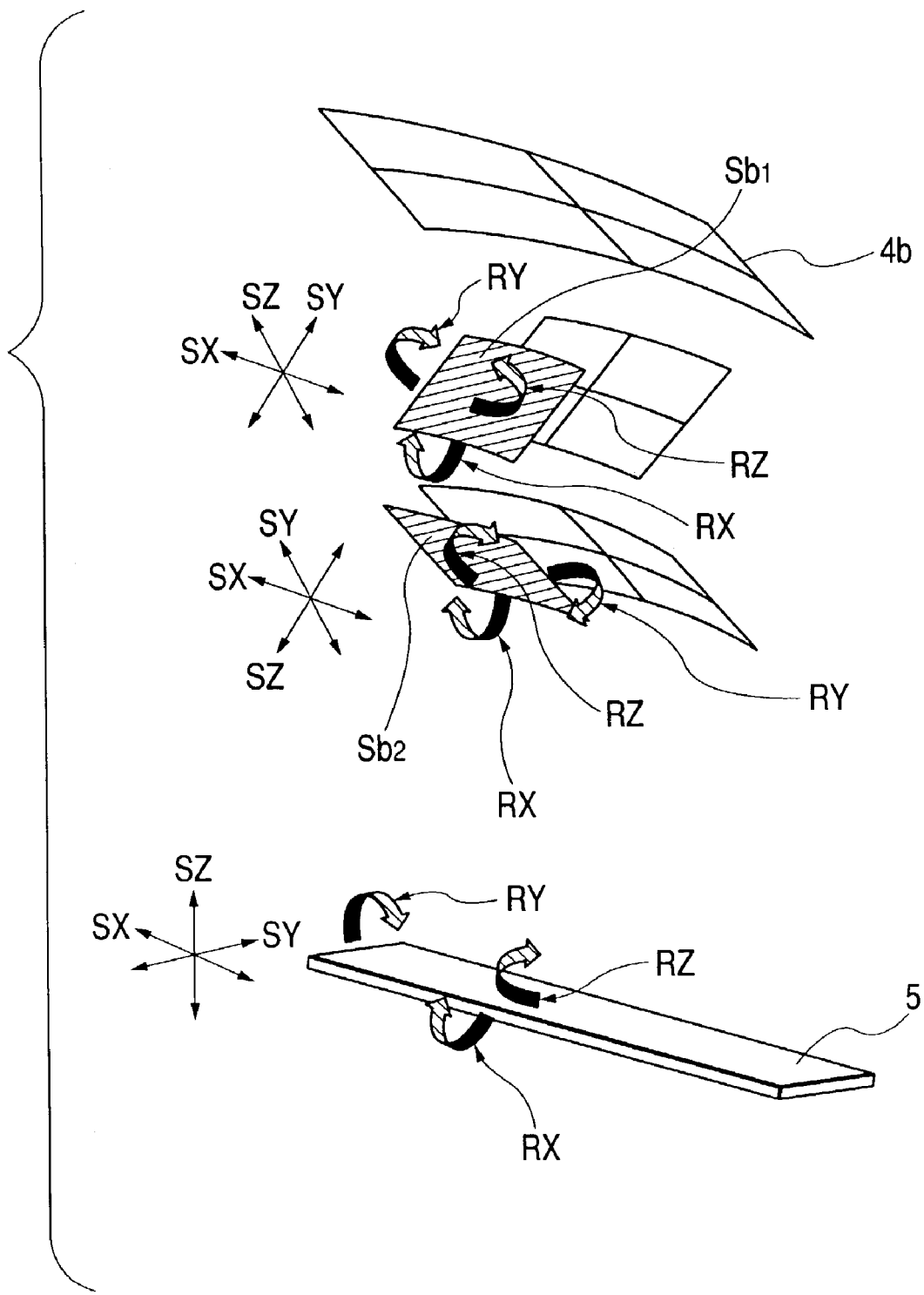
FIG. 15 is a perspective view of an imaging optical element and a line sensor of the sixth embodiment of the present invention.

FIGS. 14 and 15 show a sixth embodiment of the present invention. FIG. 14 is a schematic sectional view of an image reading apparatus of the sixth embodiment. Since reference symbols in the figure and functions of the components denoted by the reference symbols are the same as those in FIG. 12, descriptions thereof will be omitted. The sixth embodiment is different from the fifth embodiment shown in FIG. 12 in that the number of return mirrors 3 is two and the number of off-axial reflection surfaces of the imaging optical element 4 is five.

FIG. 15 shows a perspective view of an imaging optical element 4b and a line sensor 5 of the sixth embodiment. In this embodiment, there are two off-axial reflection surfaces (Sb1, Sb2) used in adjustment. Consequently, the adjustment can be performed easily by separately setting a surface for correcting deviation of an MTF in a main-scanning direction and an MTF in a sub-scanning direction and a surface for correcting distortion. Moreover, the line sensor 5 pivotably attached and used in the adjustment. Therefore, by using the line sensor in the adjustment, it becomes possible to particularly perform correction of focus position deviation, that is, one side blurring in the main-scanning direction.

According to the present invention, an imaging optical system is constituted by off-axial reflection surfaces, thereby providing a compact imaging optical system in which occurrence of an asymmetrical aberration is reduced and the optical performance is not deteriorated significantly, and an image reading apparatus using the same.

What is claimed is:

1. An imaging optical system for imaging image information of an object surface on a line sensor,
wherein the imaging optical system has two kinds of reflection surfaces, a first kind being off-axial reflection surfaces and a second kind being reflection surfaces other than off-axial reflection surfaces, and
wherein, when the number of times of reflection on the two kinds of reflection surfaces existing in an optical path from the object surface to the line sensor is assumed to be N and the number of times of reflection on the off-axial reflection surfaces is assumed to be n, conditional expressions $N \leq 10$ and $0.3 \leq n/N \leq 1.0$ are satisfied.

2. An imaging optical system according to claim 1,
wherein a plane reflection surface is of the second kind and is used as a reflection surface closest to the object side.

3. An imaging optical system according to claim 1,
wherein in a plane having a normal line along a sub-scanning direction, an angle defined by a reference axis light beam incident on a first reflection surface from the object surface and a reference axis light beam emitted on the line sensor from the off axial reflection surfaces is 30° or more.

4. An imaging optical system according to claim 1,
wherein a plane reflection surface of the second kind and the off-axial reflection surfaces of the first kind are formed on a housing for holding the line sensor.

5. An imaging optical system according to claim 1,
wherein a conditional expression n/N=1 is satisfied.

6. An image reading apparatus comprising:
an imaging optical system according to claim 1;
an original table glass on which an original is mounted; and
a line sensor.

7. An imaging optical system according to claim 1,
wherein a conditional expression $0.5 < n/N < 1.0$ is satisfied.

8. An image reading apparatus comprising:
an imaging optical element composed of a plurality of off-axial reflection surfaces;
an original table glass on which an original is mounted;
a line sensor; and
a carriage including the imaging optical element and the line sensor,
wherein at least one surface of the off-axial reflection surfaces is pivotably attached to the carriage.

9. An image reading apparatus according to claim 8,
wherein, assuming that a surface normal line in a point where a reference axis light beam is incident on the surface is Z axis, a direction parallel to a main-scanning direction on a plane perpendicular to the surface normal line is X axis, and a direction perpendicular to the X axis is Y axis, a pivotal direction of the pivotable off-axial reflection surfaces is at least one direction among six directions of parallel movement in the X, Y, and Z directions and rotational movement with the X, Y, and Z axis as rotation centers.

10. An image reading apparatus according to claim 8,
wherein the pivotable off-axial reflection surface is in the vicinity of a diaphragm.

11. An image reading apparatus according to claim 8,
wherein the line sensor is pivotably attached.

12. An image reading apparatus according to claim 8,
wherein the pivotable off axial reflection surface is pivotally adjusted with reference to an output from the line sensor.

13. An image reading apparatus according to claim 12,
wherein the pivotable off-axial reflection surface is adhered upon completion of the pivotal adjustment.

14. An imaging optical system for imaging image information of an object surface on a line sensor,
wherein the imaging optical system has two kinds of reflection surfaces, a first kind being off-axial reflection surfaces, and a second kind being a reflection surface other than the off-axial reflection surfaces,
the imaging optical system does not have a refraction plane, and
when the number of times of reflection on the two kinds of reflection surfaces existing in an optical path from the object surface to the line sensor is assumed to be N and the number of times of reflection on the off-axial reflection surfaces is assumed to be n, conditional expressions $N \leq 10$, and $0.3 \leq n/N \leq 1.0$ are satisfied.

15. An imaging optical system according to claim 1,
wherein a conditional expression n/N=1 is satisfied.

* * * * *

UNITED STATES PATENT AND TRADEMARK OFFICE
CERTIFICATE OF CORRECTION

PATENT NO. : 7,414,761 B2
APPLICATION NO. : 10/439018
DATED : August 19, 2008
INVENTOR(S) : Nobuyuki Tochigi et al.

It is certified that error appears in the above-identified patent and that said Letters Patent is hereby corrected as shown below:

COLUMN 1:
    Line 36, "second," should read -- second --.

COLUMN 2:
    Line 8, "asymmetry" should read -- asymmetrical --.

COLUMN 3:
    Line 37, "all" should read -- entire --.

COLUMN 5:
    Line 22, "of less." should read -- or less. --.

COLUMN 6:
    Line 42, "in the" should read -- the --.

COLUMN 8:
    Line 61, "$Z=C^{02}y2+$" should read -- $Z=C_{20}y2+$ --.

COLUMN 11:
    Line 49, "$C_{24}=44.2473e\text{-}7$" should read -- $C_{24}=4.2473e\text{-}7$ --.

COLUMN 13:
    Line 45, "$C_{24}=2.0547e\text{-}12$" should read -- $C_{24}=-2.0547e\text{-}12$ --.

COLUMN 17:
    Line 10, "$C_{60}=11.1843e\text{-}12$" should read -- $C_{60}=1.1843e\text{-}12$ --.

COLUMN 19:
    Line 12, "sensor 5" should read -- sensor 5 is --.

UNITED STATES PATENT AND TRADEMARK OFFICE
CERTIFICATE OF CORRECTION

PATENT NO. : 7,414,761 B2
APPLICATION NO. : 10/439018
DATED : August 19, 2008
INVENTOR(S) : Nobuyuki Tochigi et al.

It is certified that error appears in the above-identified patent and that said Letters Patent is hereby corrected as shown below:

COLUMN 20:
Line 34, "off axial" should read -- off-axial --.

Signed and Sealed this

Twentieth Day of January, 2009

JON W. DUDAS
*Director of the United States Patent and Trademark Office*